United States Patent
Adachi et al.

(10) Patent No.: US 9,945,098 B2
(45) Date of Patent: Apr. 17, 2018

(54) SHOVEL INCLUDING POWER STORAGE DEVICE WITH HOUSING HAVING COOLANT FLOW PATH

(71) Applicant: SUMITOMO HEAVY INDUSTRIES, LTD., Tokyo (JP)

(72) Inventors: Shuntaro Adachi, Yokosuka (JP); Terunobu Nakajyo, Yokosuka (JP); Kazuya Yokoyama, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 687 days.

(21) Appl. No.: 14/260,319

(22) Filed: Apr. 24, 2014

(65) Prior Publication Data

US 2014/0234062 A1    Aug. 21, 2014

Related U.S. Application Data

(63) Continuation of application No. PCT/JP2012/077045, filed on Oct. 19, 2012.

(30) Foreign Application Priority Data

Oct. 26, 2011  (JP) .................................. 2011-234727
Oct. 27, 2011  (JP) .................................. 2011-235880
Jan. 16, 2012  (JP) .................................. 2012-006140

(51) Int. Cl.
*H01M 2/10*    (2006.01)
*H01M 10/613*  (2014.01)
(Continued)

(52) U.S. Cl.
CPC .............. *E02F 9/0866* (2013.01); *E02F 3/30* (2013.01); *E02F 9/0858* (2013.01);
(Continued)

(58) Field of Classification Search
CPC ..... E02F 9/0858; E02F 9/2091; E02F 9/0866; H01M 10/613; H01M 10/6551; H01M 10/6557; H01M 2/1077; H01M 2/1083
(Continued)

(56) References Cited

U.S. PATENT DOCUMENTS 5,477,936 A * 12/1995 Sugioka .................. B60R 16/04
                                                      180/68.5
5,756,227 A    5/1998 Suzuki et al.
(Continued)

FOREIGN PATENT DOCUMENTS

CN    101978549 A    2/2011
CN    102640347 A    8/2012
(Continued)

OTHER PUBLICATIONS

Watanabe, et al., Machine Translation of JP 2011-210657 A, Oct. 2011.*

(Continued)

*Primary Examiner* — Sean P Cullen
(74) *Attorney, Agent, or Firm* — Squire Patton Boggs (US) LLP

(57) ABSTRACT

An upper turning body is mounted on a lower travelling body to be capable of turning. An attachment is arranged in the upper turning body. A power storage device is arranged in the upper turning body together with the attachment. A discharge current from the power storage device drives electric parts. The power storage device has a housing in which a first flow path for coolant's flow is formed. A power storage module is arranged inside the housing. The power storage module includes stacked power storage cells, and the power storage cells are thermally coupled to the first flow path. The housing includes a lower housing and an upper housing. The first flow path is formed in one of a bottom (Continued)

panel of the lower housing and an upper panel of the upper housing.

14 Claims, 21 Drawing Sheets

(51) Int. Cl.
    *H01M 10/6551*     (2014.01)
    *H01M 10/6557*     (2014.01)
    *E02F 3/30*     (2006.01)
    *E02F 9/08*     (2006.01)
    *E02F 9/20*     (2006.01)

(52) U.S. Cl.
    CPC ......... *E02F 9/2091* (2013.01); *H01M 2/1077* (2013.01); *H01M 2/1083* (2013.01); *H01M 10/613* (2015.04); *H01M 10/6551* (2015.04); *H01M 10/6557* (2015.04)

(58) Field of Classification Search
    USPC .................. 429/120, 158, 159; 414/687
    See application file for complete search history.

(56) References Cited

U.S. PATENT DOCUMENTS

| | | | |
|---|---|---|---|
| 5,985,483 A | 11/1999 | Verhoog et al. | |
| 2002/0102457 A1* | 8/2002 | Oogami | B60L 3/0046 429/159 |
| 2004/0148817 A1* | 8/2004 | Kagoshima | B60K 6/12 37/348 |
| 2009/0142628 A1 | 6/2009 | Okada et al. | |
| 2011/0020676 A1 | 1/2011 | Kurosawa | |
| 2011/0024207 A1* | 2/2011 | Higashino | H01M 2/0245 180/65.1 |
| 2011/0111649 A1* | 5/2011 | Garascia | H01M 2/1077 439/890 |
| 2011/0206948 A1* | 8/2011 | Asai | H01M 2/0473 429/7 |
| 2012/0115016 A1* | 5/2012 | Kim | H01M 2/1061 429/159 |
| 2012/0156541 A1* | 6/2012 | Sohn | H01M 10/0525 429/120 |
| 2012/0156543 A1* | 6/2012 | Cicero | H01M 2/024 429/120 |
| 2012/0234613 A1 | 9/2012 | Miyatake | |
| 2013/0059180 A1* | 3/2013 | Yang | H01M 2/1077 429/72 |
| 2013/0209850 A1* | 8/2013 | Yokoyama | H01G 11/12 429/99 |

FOREIGN PATENT DOCUMENTS

| | | |
|---|---|---|
| DE | 698 23 156 T2 | 11/2004 |
| DE | 11 2010 004 703 T5 | 11/2012 |
| EP | 0 933 830 A1 | 8/1999 |
| EP | 2 065 963 A2 | 6/2009 |
| EP | 2 262 048 A1 | 12/2010 |
| FR | 2 774 215 A1 | 7/1999 |
| JP | 08-148187 A | 6/1996 |
| JP | 11-273752 A | 10/1999 |
| JP | 2005-057007 A | 3/2005 |
| JP | 2009-134938 A | 6/2009 |
| JP | 2009-259785 A | 11/2009 |
| JP | 2010-206915 A | 9/2010 |
| JP | 2010-218716 A | 9/2010 |
| JP | 2011-103259 A | 5/2011 |
| JP | 2011-210657 A | 10/2011 |
| JP | 2011210657 A * | 10/2011 |
| JP | 2013-038439 A | 2/2013 |
| KR | 10-2012-0088807 A | 8/2012 |
| WO | WO 2009/119037 A1 | 10/2009 |
| WO | WO 2011/070758 A1 | 6/2011 |

OTHER PUBLICATIONS

International Search Report dated Jan. 22, 2013 corresponding to International Patent Application No. PCT/JP2012/077045 and English translation thereof.

* cited by examiner

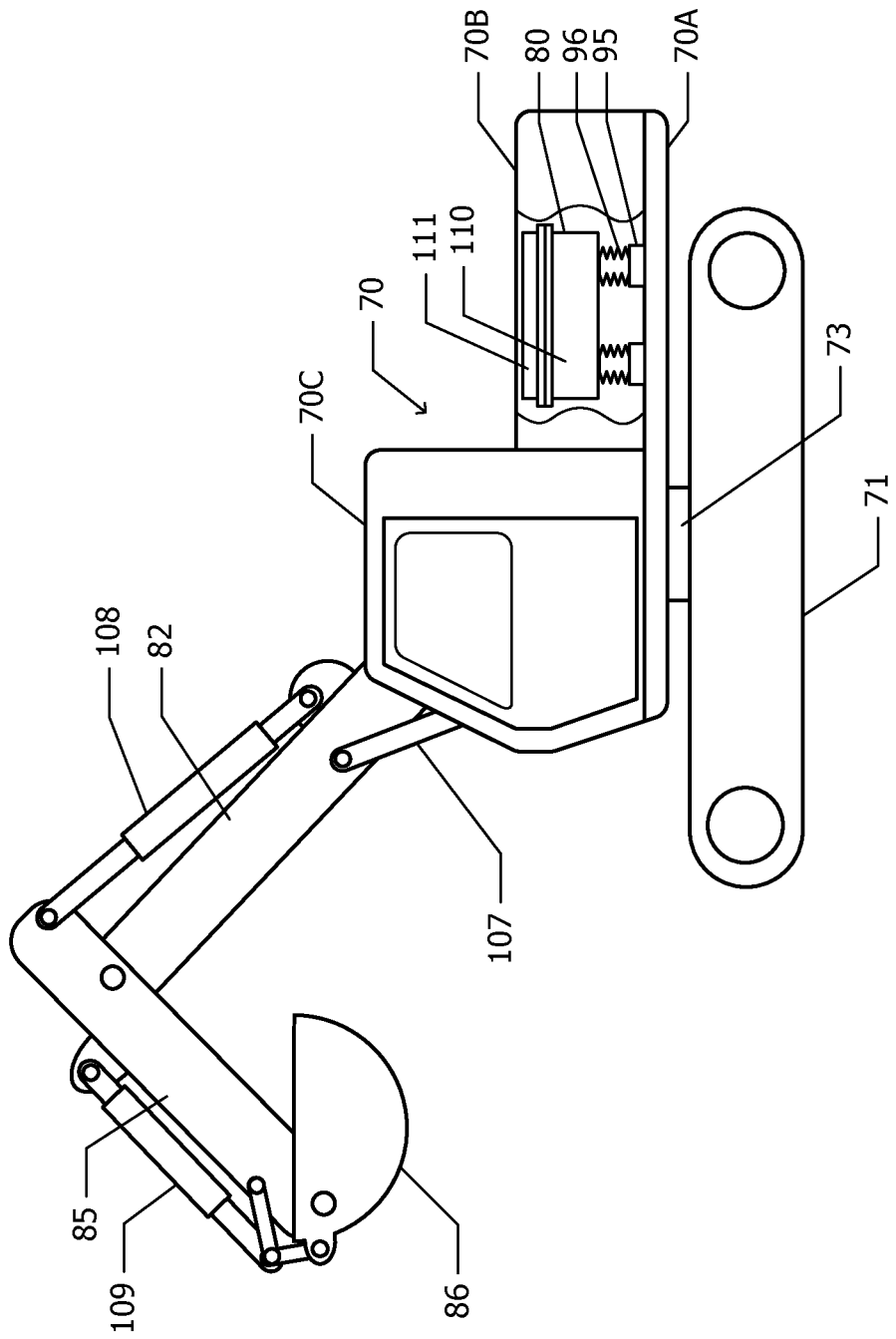

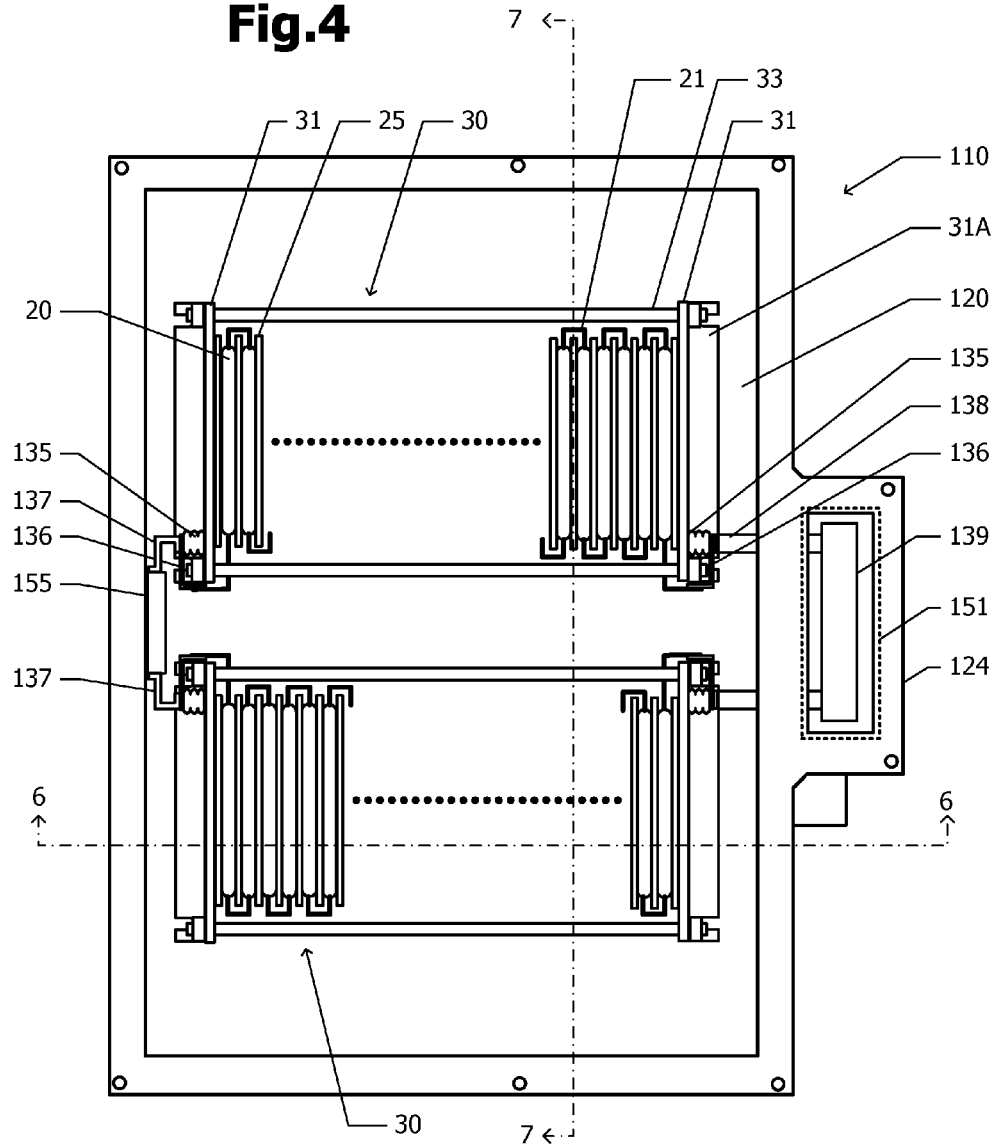

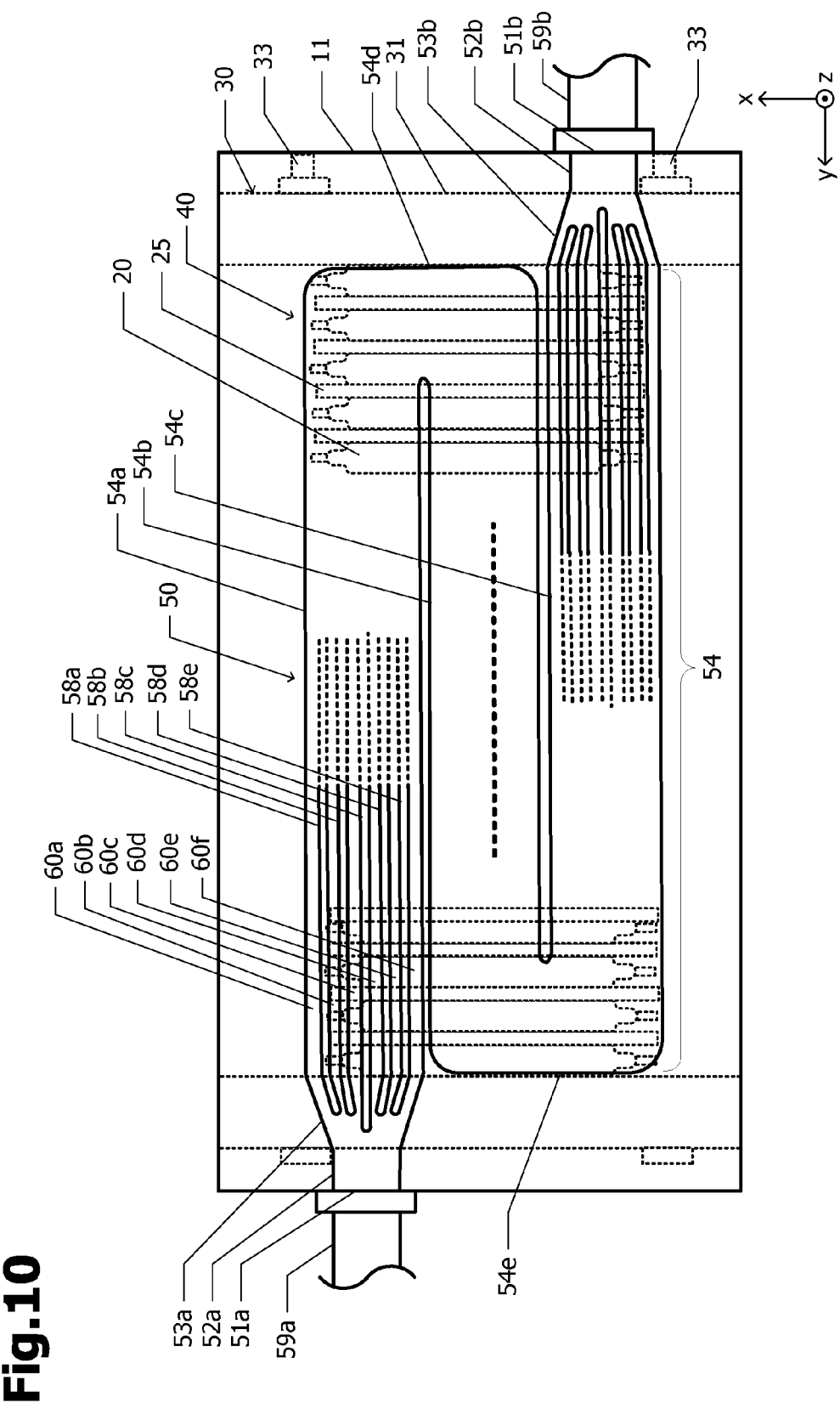

SHOVEL INCLUDING POWER STORAGE DEVICE WITH HOUSING HAVING COOLANT FLOW PATH

RELATED APPLICATION

This is a Continuation of International Patent Application No. PCT/JP2012/077045 filed Oct. 19, 2012, which claims priority from Japanese Patent Application No. 2011-234727 filed Oct. 26, 2011, Japanese Patent Application No. 2011-235880 filed Oct. 27, 2011, and Japanese Patent Application No. 2012-006140 filed Jan. 16, 2012. The contents of these applications are hereby incorporated by reference.

BACKGROUND

Technical Field

The present invention relates to a shovel equipped with a power storage device.

Description of Related Art

A power storage module has been known in which a plurality of plate-shaped power storage cells are stacked on one another and the stacked power storage cells are connected in series. A heat transfer plate for cooling is inserted between the power storage cells. Pushing plates are arranged in both ends of a stacked body formed of the power storage cells and the heat transfer plates, and tie rods are passed through two pushing plates. The tie rods apply compressive force to the stacked body.

Two pairs of wallboards are arranged on the left, right, top and bottom of the stacked body, and are fixed to the pushing plates by bolts or the like. One pair of wallboards is thermally coupled to the heat transfer plates via end surfaces of the heat transfer plates, thereby absorbing heat of the heat transfer plates. Two pushing plates and two pairs of wallboards are fixed to each other by the bolts so as to configure a robust parallelepiped structure. This can improve impact resistance of the power storage module.

A shovel includes a lower travelling body having crawlers and an upper turning body mounted thereon. Many parts such as an engine, a counterweight, a cabin, a hydraulic oil tank, a fuel tank and the like are mounted on the upper turning body. Accordingly, there are limitations on a space for installing the power storage device accommodating the power storage module.

SUMMARY

When mounting a power storage module enclosed by a parallelepiped structure on a working machine such as a shovel, the power storage module are accommodated in a housing in conjunction with the parallelepiped structure to configure a power storage device. In order to reduce the manufacturing cost and the cost of parts, it is necessary to reduce the number of the parts. In addition, since there are limitations on a space for installing the power storage device, it is desired to miniaturize the power storage device.

According to an aspect of the present invention, there is provided a shovel that includes:
  a lower travelling body;
  an upper turning body that is pivotally mounted on the lower travelling body;
  an attachment that is arranged in the upper turning body;
  a power storage device that is arranged in the upper turning body together with the attachment; and
  an electric part that is driven by a discharge power from the power storage device.

The power storage device has:
  a housing in a first wallboard of which a first flow path for coolant's flow is formed; and
  a power storage module which is arranged inside the housing, and in which a plurality of power storage cells are stacked on one another and each of the power storage cells is thermally coupled to the first flow path.

Since the first flow path is formed in the first wallboard, the number of parts can be decreased comparing the case where a cooling board with cooling flow path is prepared in particular.

BRIEF DESCRIPTION OF THE DRAWINGS

FIG. 2 is a partially cutaway side view of the shovel according to embodiment 1.

FIG. 4 is a plan view of the lower housing and parts accommodated in the lower housing of the power storage device according to embodiment 1.

FIG. 10 illustrates a positional relationship between a flow path inside a cooling plate and a power storage module.

DETAILED DESCRIPTION

Embodiment 1

Figure 1:
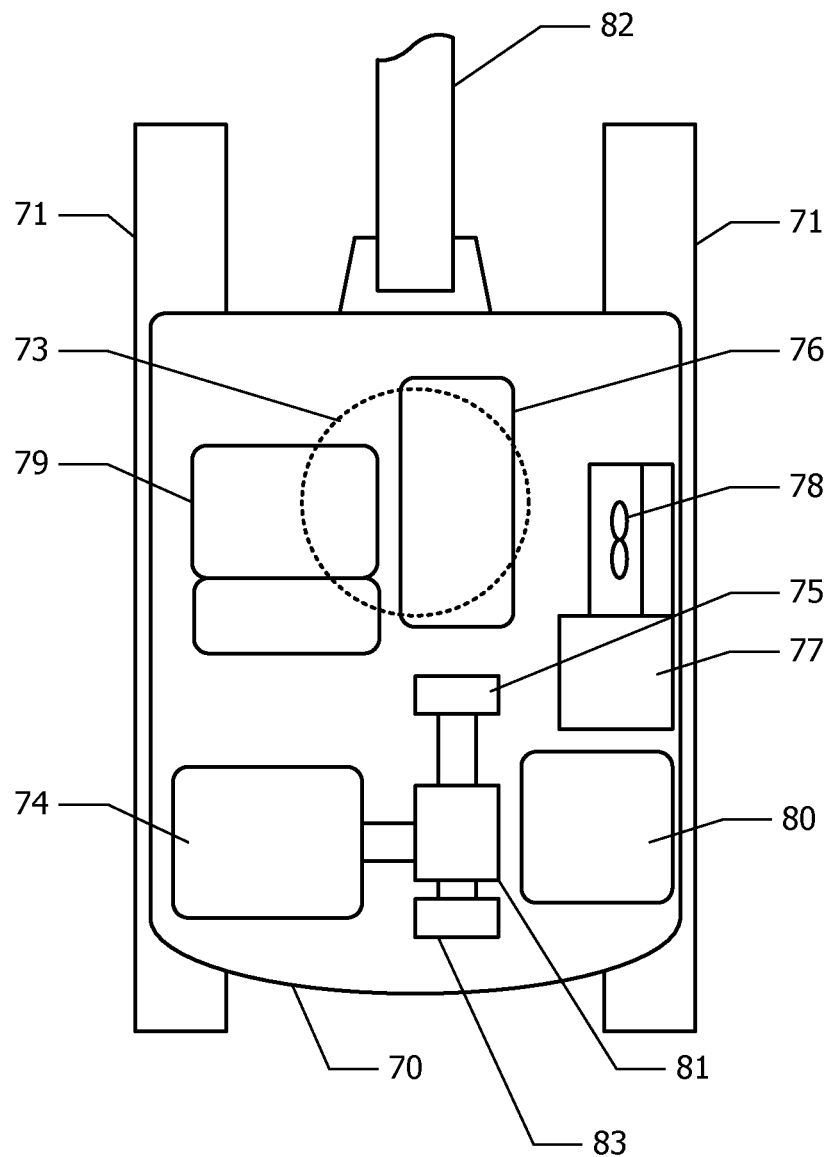
FIG. 1 is a schematic plan view of a shovel according to embodiment 1.

FIG. 1 is a schematic plan view of a shovel as an example of a hybrid type working machine according to embodiment 1. A lower travelling body 71 is attached to an upper turning body 70 via a pivot bearing 73. An engine 74, a hydraulic pump 75, an electric motor (electric part) 76, an oil tank 77, a cooling fan 78, a cabin 70C, a power storage device 80 and an electric motor-generator (electric part) 83 are mounted on the upper turning body 70. A seat 79 is installed inside the cabin 70C. The engine 74 generates motive power by using combustion of fuel. The engine 74, the hydraulic pump 75 and the electric motor-generator 83 mutually transmit and receive a torque via a torque transmission mechanism 81. The hydraulic pump 75 supplies pressurized oil to hydraulic cylinders for a boom 82 and the like configuring an attachment.

The electric motor-generator 83 is driven by the motive power of the engine 74 and generates electric power (power generating operation). The generated power is supplied to the power storage device 80 and the power storage device 80 is charged. In addition, the electric motor-generator 83 is driven by the electric power from the power storage device 80, and generates the motive power to assist the engine 74 (assisting operation). The oil tank 77 stores oil of a hydraulic circuit. The cooling fan 78 suppresses an increase in an oil temperature in the hydraulic circuit. An operator sits on the seat 79 and operates the shovel.

The electric power supplied from the power storage device 80 drives a turning motor 76. The turning motor 76 turns around the upper turning body 70. In addition, the turning motor 76 generates regenerative power by converting kinetic energy into electric energy. The generated regenerative power charges the power storage device 80.

FIG. 2 is a partially cutaway side view of the shovel according to the embodiment 1. The upper turning body 70 is mounted on the lower travelling body 71 via the pivot bearing 73. The upper turning body 70 includes a turning frame 70A, a cover 70B and a cabin 70C. The turning frame 70A functions as a support structure for the cabin 70C and various parts. The cover 70B covers various parts mounted on the turning frame 70A, for example, the power storage device 80 or the like. The seat 79 (refer to FIG. 1) is accommodated inside the cabin 70C.

The turning motor 76 (refer to FIG. 1) turns the turning frame 70A which is to be driven clockwise or counterclockwise with respect to the lower travelling body 71. A boom 82 is attached to the upper turning body 70. The boom 82 is adapted to swing vertically with respect to the upper turning body 70 by a boom cylinder 107 which is hydraulically driven. An arm 85 is attached to a tip of the boom 82. The arm 85 is adapted to swing back and forth with respect to the boom 82 by an arm cylinder 108 which is hydraulically driven. A bucket 86 is attached to a tip of the arm 85. The bucket 86 is adapted to swing vertically with respect to the arm 85 by a bucket cylinder 109 which is hydraulically driven. The boom 82, the arm 85 and the bucket 86 configure the attachment.

The power storage device 80 is mounted on the turning frame 70A via a power storage device mount 95 and a damper (vibration control device) 96. The power storage device 80 is arranged behind the cabin 70C, for example. The cover 70B covers the power storage device 80. The power storage device 80 includes a lower housing 110 opened upward and an upper housing 111 covering the opened portion of the lower housing 110. A power storage module is accommodated inside a housing consisting of the lower housing 110 and the upper housing 111.

The turning frame 70A is largely vibrated as compared to a general transportation vehicle while travelling and working. Therefore, the power storage device 80 mounted on the turning frame 70A is likely to receive a great impact. It is possible to ensure sufficient reliability against the impact by employing a structure described below in the power storage device 80.

Figure 3A:
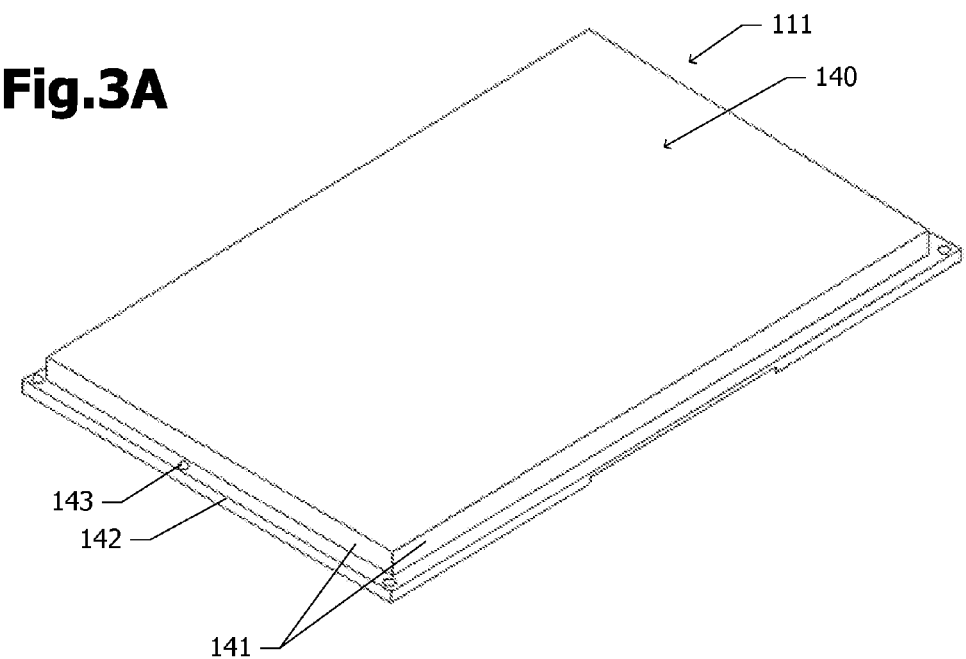
FIGS. 3A and 3B are respectively perspective views of an upper housing and a lower housing of a power storage device according to embodiment 1.
Figure 3B:
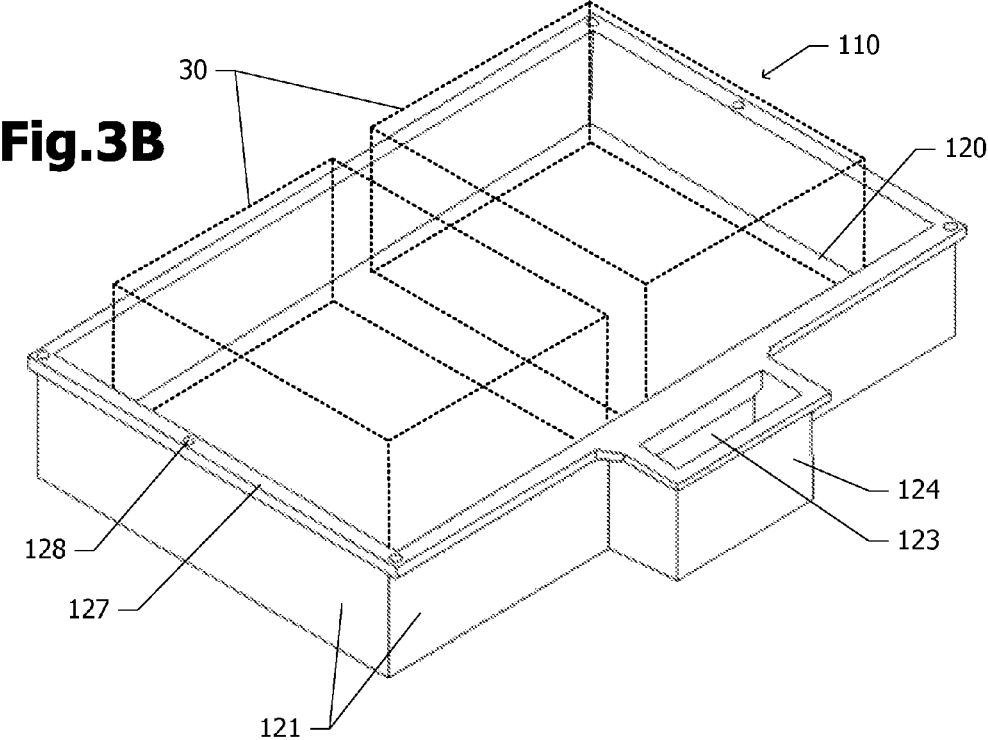

FIGS. 3A and 3B are respective perspective views of the upper housing and the lower housing of the power storage device according to the embodiment 1.

As illustrated in FIG. 3B, the lower housing 110 includes a rectangular bottom panel 120 and four side panels 121 extending upward from an edge the bottom panel 120. The lower housing 110 is opened upward and the opened portion of the lower housing 110 is closed by the upper housing 111 (refer to FIG. 3A). A flange 127 is provided at an upper end of the side panels 121. More than one through-hole 128 for inserting a bolt is formed in the flange 127. The lower housing 110 and the upper housing 111 are respectively formed by using a casting method, for example.

Two power storage modules 30 are attached onto the bottom panel 120. As will be described later, the power storage modules 30 respectively have a stacked structure where a plurality of power storage cells is stacked on one another. Two power storage modules 30 are arranged side by side so that stacked directions of the power storage cells are parallel to each other. An opening 123 is formed in the center of one side panel 121 intersecting the stacked direction of the power storage module 30.

Outside the side panel 121 on which the opening 123 is formed, a connector box 124 is arranged so as to close the opening 123. An upside of the connector box 124 is opened. The opened portion is closed by a connector. The power storage modules 30 are connected to an external electric circuit via the connector.

As illustrated in FIG. 3A, the upper housing 111 includes an upper panel 140 and side panels 141 extending downward from edges of the upper panel 140. An outer periphery of the upper panel 140 is aligned with an outer periphery of the bottom panel 120 of the lower housing 110. A height of the side panels 141 of the upper housing 111 is lower than a height of the side panels 121 of the lower housing 110. For example, the height of the side panels 141 is approximately 25% of the height of the side panels 121. A flange 142 is provided at a lower end of the side panels 141. More than one through-hole 143 is formed in the flange 142. The through-holes 143 are arranged at positions corresponding to the through-holes 128 of the lower housing 110.

A coolant flow path is formed in the upper panel 140. A configuration of this flow path will be described in detail later in embodiment 2 to embodiment 4. Similarly, a coolant flow path is also formed in the bottom panel 120 of the lower housing 110.

FIG. 4 is a plan view of the lower housing 110 and the power storage modules 30 accommodated inside the lower housing 110. Two power storage modules 30 are arranged on the bottom panel 120. Hereinafter, a structure of the power storage modules 30 will be described.

Power storage cells 20 and heat transfer plates 25 are stacked on one another. For example, an electric double layer capacitor, a lithium ion battery, a lithium ion capacitor and the like which have a tabular shape are used as the power storage cells 20. For example, an aluminum plate is used as the heat transfer plate 25. In FIG. 4, an example is illustrated in which the power storage cells 20 and the heat transfer plates 25 are alternately stacked one by one, but are not necessarily stacked alternately one by one. For example, considering two power storage cells 20 and one heat transfer plate 25 as a unit, a plurality of units may be stacked.

Pushing plates 31 are respectively arranged at both ends of a stacked body of the power storage cells 20 and the heat transfer plates 25. Tie rods 33 extend from one pushing plate 31 to the other pushing plate 31, and applies compressive force acting in the stacked direction to the stacked body of the power storage cells 20 and the heat transfer plates 25. A lower end of each of the pushing plates 31 is bent in an L-shape. A tip portion 31A outside of the bent portion is fixedly screwed to the bottom panel 120 of the lower housing 110.

Each of the power storage cells 20 has a pair of electrode terminals 21. The power storage cells 20 are connected in series by connecting the electrode terminals 21 to each other. The electrode terminals 21 are connected to each other outside an edge of the heat transfer plate 25, and are insulated from the heat transfer plate 25. One of the electrode terminals 21 of each of the power storage cells 20 at both ends, the one being not connected to the adjacent power storage cell 20, is connected to a relay plate 136. The relay plate 136 is fixed to an outer surface of the pushing plate 31 via an insulator 135.

The relay plates 136 of two power storage modules 30, which are located on the opposite side (left side in FIG. 4) to the connector box 124, are connected to each other by a bus bar 137 and a fuse 155. The relay plates 136 of two power storage modules 30, which are located at the other side (right side in FIG. 4), are connected to a relay circuit 139 via bus bars 138, respectively. The relay circuit 139 is connected to a connector 151 which closes the opening of the connector box 124.

Electrical components required for operations of the power storage modules 30 may be accommodated in an empty space inside the lower housing 110. The electrical components are electrically connected to the power storage modules 30.

Figure 5:
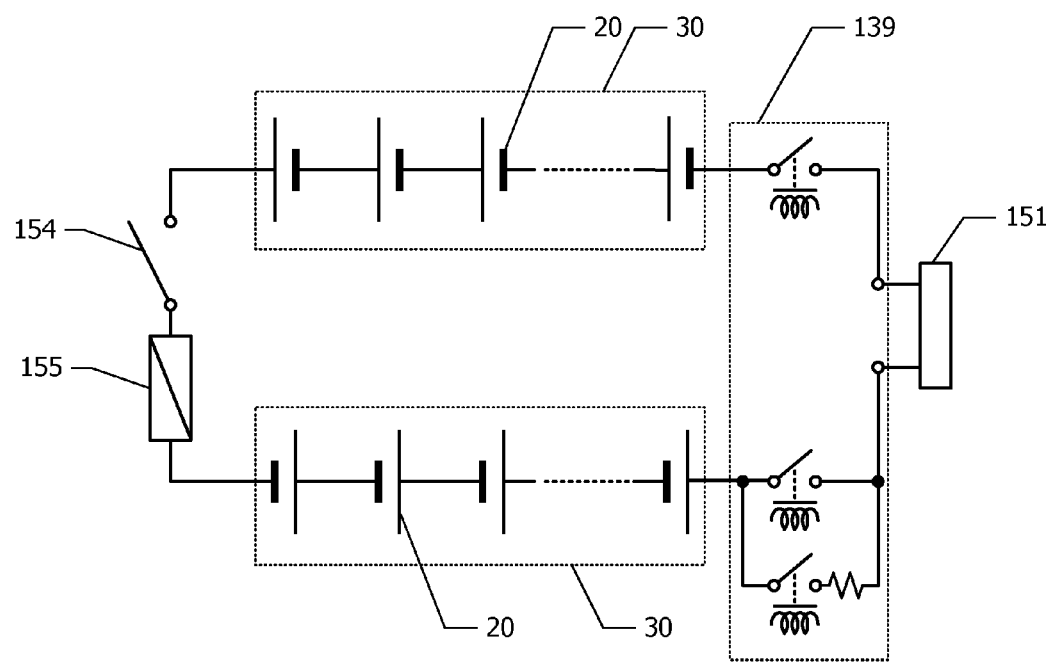
FIG. 5 is an equivalent circuit diagram of the power storage device according to embodiment 1.

FIG. 5 is an equivalent circuit diagram of the power storage device. The power storage module 30 includes the power storage cells 20 which are connected in series. A positive electrode of one power storage module 30 is connected to a negative electrode of the other power storage module 30 via a switch 154 and the fuse 155. The negative electrode of one power storage module 30 and the positive electrode of the other power storage module 30 are connected to the connector 151 via the relay circuit 139. A resistor element connected to a relay in series is disposed to prevent an inrush current from flowing when an external capacitor is precharged.

Figure 6:
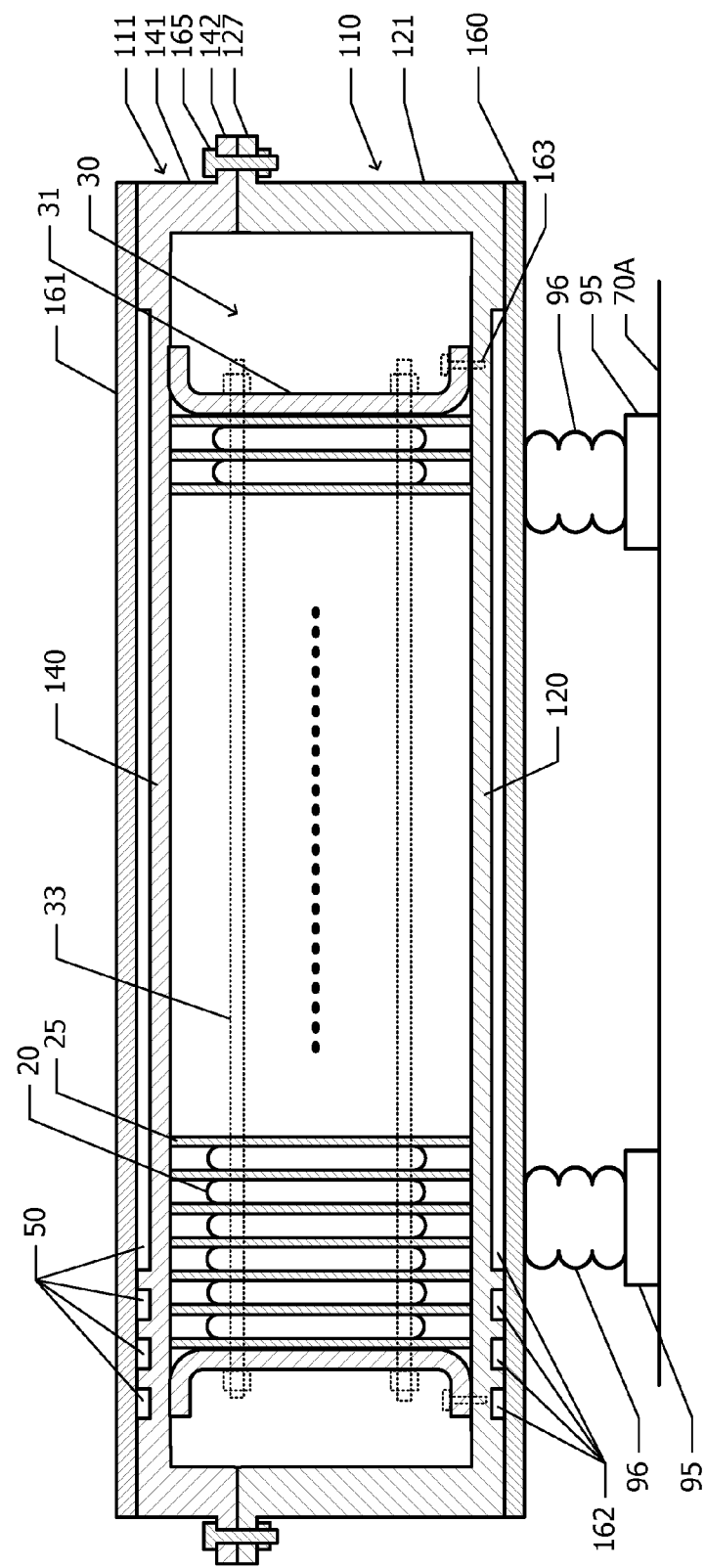
FIG. 6 is a cross-sectional view taken long a one-dot-chain line 6-6 in FIG. 4.

FIG. 6 is a cross-sectional view taken along a one-dot-chain line 6-6 in FIG. 4. The pushing plates 31 of the power storage module 30 are fixed to the bottom panel 120 of the lower housing 110 by using screws 163. The lower housing 110 is attached to the turning frame 70A via a damper 96 and the power storage device mount 95. The upper opening of the lower housing 110 is closed by the upper housing 111. A fastener 165 penetrates the flange 127 of the lower housing 110 and the flange 142 of the upper housing 111. The fastener 165 applies a force to the lower housing 110 and the upper housing 111 in a direction where both of these get closer to each other. If necessary, a gasket is inserted into a contact part between the lower housing 110 and the upper housing 111. This allows a space between the lower housing 110 and the upper housing 111 to be hermetically isolated from the outside. The connector box 124 (refer to FIG. 3B) has an opening through which the access from the outside is allowed. The opening is closed by the connector 151 and a gasket is arranged, if necessary.

The heat transfer plate 25 comes into contact with the bottom panel 120 of the lower housing 110 on a lower end surface thereof, and comes into contact with the upper panel 140 of the upper housing 111 on an upper end surface thereof. Since the upper housing 111 is pressed against the lower housing 110 by the fastener 165, a position of the heat transfer plate 25 is firmly fixed thereto inside the housing. The screws 163 perform a role of temporarily fixing the power storage modules 30 to the lower housing 110 in an intermediate stage during assembly work of the power storage device. The fixing by using only the screws 163 is unlikely to ensure sufficient reliability against severe vibrations. In particular, when mounted on the working machine such as the shovel, the power storage device needs high reliability against vibrations and impacts. In the power storage device according to the embodiment 1, the fastener (pressurizing mechanism) 165 pressurizes the power storage modules 30 so as to be firmly fixed and not to be slidable inside the housing consisting of the upper housing 111 and the lower housing 110. Therefore, even when the power storage device is mounted on the working machine such as the shovel, it is possible to ensure sufficient vibration resistance and impact resistance.

A groove is formed on an outer surface of the upper panel 140 of the upper housing 111, and a flat plate 161 closely adheres to the upper panel 140. The flat plate 161 is fixed to the upper housing 111 by screws, for example. The groove formed on the upper panel 140 and the flat plate 161 form a flow path 50. A flat plate 160 closely adheres also to an outer surface of the bottom panel 120 of the lower housing 110. The groove formed on the bottom panel 120 and the flat plate 160 form a flow path 162. In order to prevent the coolant from leaking out of the flow paths 50 and 162, gaskets may be inserted into a gap between the flat plate 160 and the bottom panel 120, and into a gap between the flat plate 161 and the upper panel 140.

The power storage cell 20 is thermally coupled to the coolant flowing in the flow paths 50 and 162 via the heat transfer plate 25. The force which presses the upper housing 111 against the lower housing 110 causes the end surface of the heat transfer plate 25 to closely adhere to the bottom panel 120 and the upper panel 140. This can reduce thermal resistance (increase heat transfer efficiency) of a contact portion between the heat transfer plate 25 and the bottom panel 120 and a contact portion between the heat transfer plate 25 and the upper panel 140.

Figure 7:
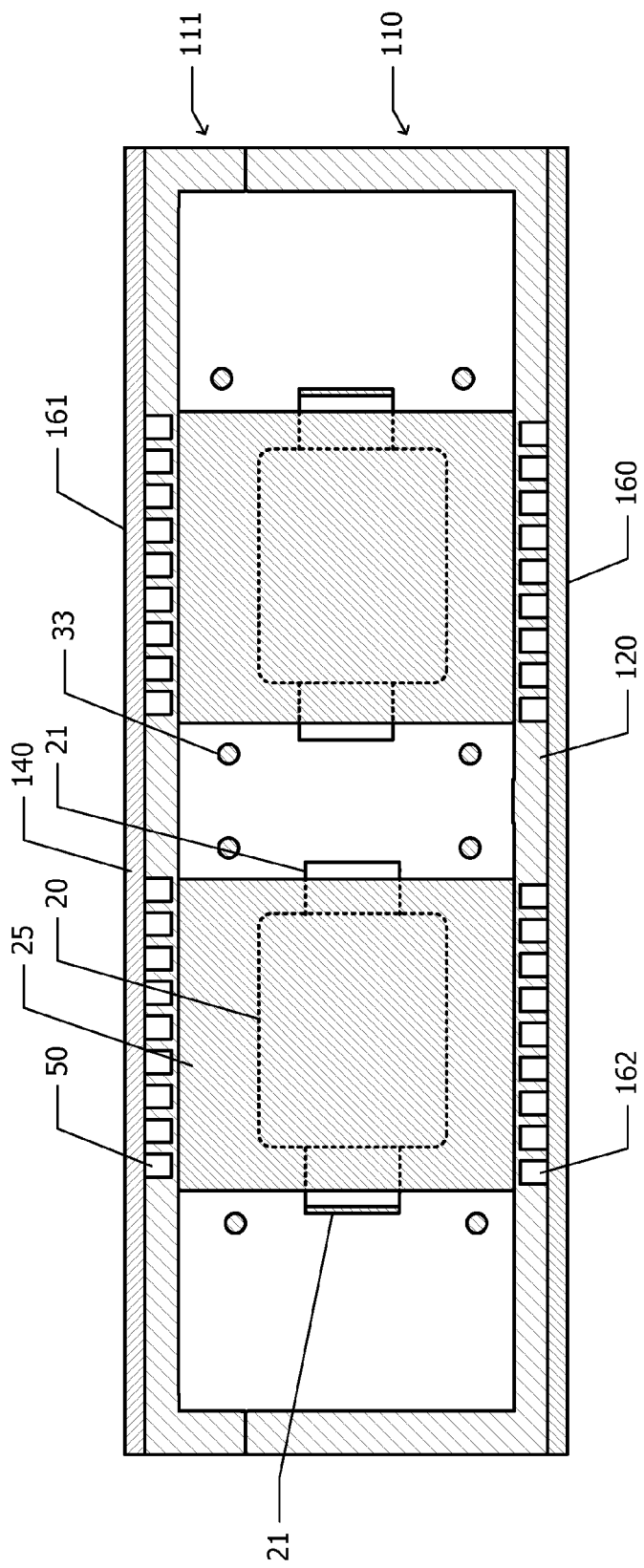
FIG. 7 is a cross-sectional view taken long a one-dot-chain line 7-7 in FIG. 4.

FIG. 7 is a cross-sectional view taken along a one-dot-chain line 7-7 in FIG. 4. The lower end of the heat transfer plate 25 is in contact with the bottom panel 120 of the lower housing 110, and the upper end is in contact with the upper panel 140 of the upper housing 111. The electrode terminals 21 are respectively drawn out from the left side edge and the right side edge of each of the power storage cells 20. The electrode terminal 21 is connected to the electrode terminal 21 of the adjacent power storage cell 20 through the outside of the edge of the heat transfer plate 25. The tie rods 33 are disposed at a position where the tie rods 33 are not in contact with the heat transfer plates 25 and the electrode terminals 21.

The bottom panel 120 of the lower housing 110 and the flat plate 160 forms the flow path 162, and the upper panel 140 and the flat plate 161 forms the flow path 50. In a horizontal direction (width direction) in FIG. 7, the flow paths 50 and 162 are preferentially arranged within a region where the heat transfer plates 25 are arranged. Therefore, it is possible to efficiently cool the heat transfer plates 25.

Figure 8:
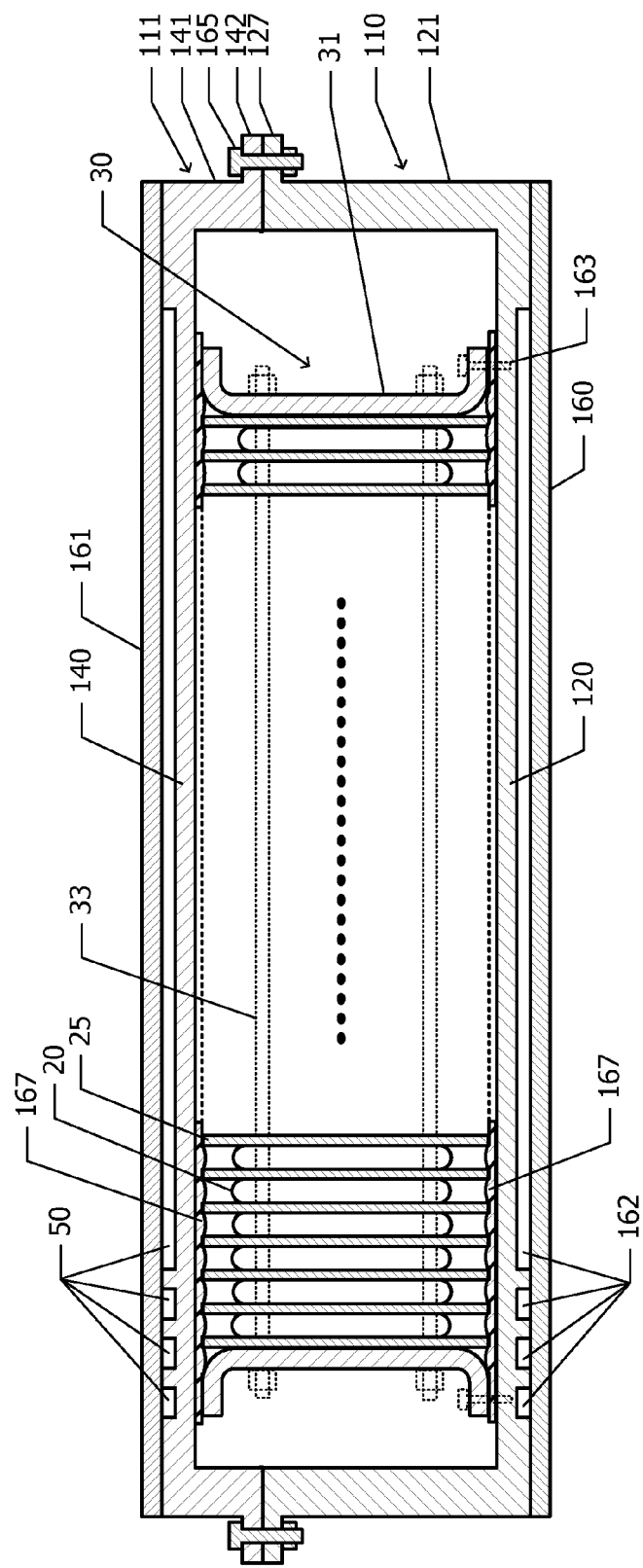
FIG. 8 is a cross-sectional view of a power storage device according to a modification example of embodiment 1.

FIG. 8 is a cross-sectional view of a power storage device according to a modification example of the embodiment 1. The cross-sectional view illustrated in FIG. 8 corresponds to the cross-sectional view illustrated in FIG. 6 of the embodiment 1. Hereinafter, points different from those of the configuration illustrated in FIG. 6 will be described, and the same configuration will be omitted in the description.

In the modification example illustrated in FIG. 8, heat transfer rubber sheets 167 are respectively arranged between the bottom panel 120 and each of the heat transfer plates 25, and between the upper panel 140 and each of the heat transfer plates 25. When the upper housing 111 is pressed against the lower housing 110, the heat transfer rubber sheets 167 are elastically deformed. This can increase the heat transfer efficiency between each of the heat transfer plates 25 and the bottom panel 120, and between each of the heat transfer plates 25 and the upper panel 140.

Embodiment 2

Figure 9A:
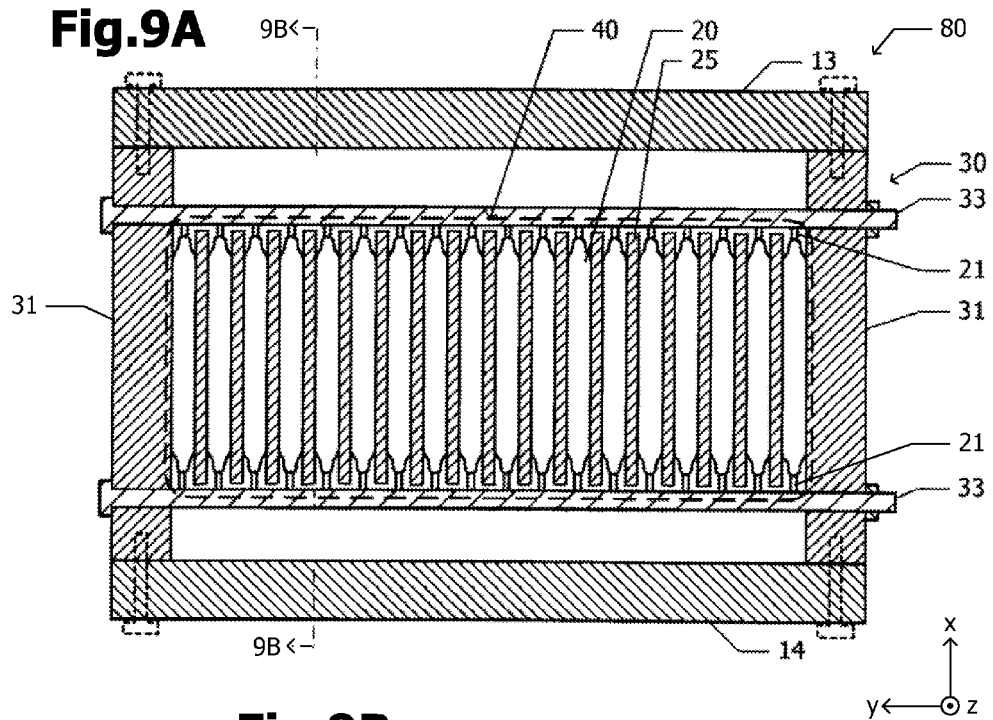
FIG. 9A is a cross-sectional view of a power storage module according to embodiment 2.

FIG. 9A is a cross-sectional view of a power storage device according to embodiment 2. The power storage device is mounted on the hybrid type shovel according to the embodiment 1 illustrated in FIGS. 1 and 2, for example. For ease of understanding, the xyz orthogonal coordinate system is defined.

The plate-shaped power storage cells 20 and the heat transfer plates 25 are alternately stacked on one another in a thickness direction thereof (y-direction). The power storage cells 20 are arranged on both sides. The pushing plates 31 closely adhere to the outermost power storage cells 20, respectively. The tie rods 33 penetrate from one pushing plate 31 to the other pushing plate 31, and apply compressive force acting in the stacked direction (y-direction) to the power storage cells 20 and the heat transfer plates 25.

Each of the power storage cells 20 includes a power storage element having a flat appearance and a pair of laminated films interposing the power storage element therebetween. The power storage element is sealed with the laminated films. An outer peripheral portion of the power storage cell 20 includes a region (fused portion) where the laminated films are fusion bonded. In addition, the power storage cell 20 includes a pair of the electrode terminals 21. The electrode terminals 21 are led outward from the opposite outer peripheral portions of each of the power storage cells 20. One of the electrode terminals 21 is the positive electrode and the other is the negative electrode. The power storage cells 20 are connected in series by connecting the electrode terminals 21 of the power storage cells 20 adjacent to each other. As the power storage cell 20, a power storage battery which can be charged and discharged, such as a lithium ion secondary battery, a lithium ion capacitor, an electric double layer capacitor and the like can be employed.

As the heat transfer plate 25, aluminum is employed, for example, and as the tie rod 33 and the pushing plate 31, stainless steel is employed, for example. The power storage module 30 is composed of the power storage cells 20, the heat transfer plates 25, the pushing plates 31 and the tie rods 33. A structure having the stacked power storage cells 20 and heat transfer plates 25 is referred to as a power storage cell stacked body 40. A pair of wallboards 13 and 14 is arranged on both sides of the power storage module 30 in the x-direction, that is, so as to interpose the power storage module 30 therebetween in the x-direction. The wallboards 13 and 14 are respectively fixed to the pushing plates 31 by bolts.

Figure 9B:
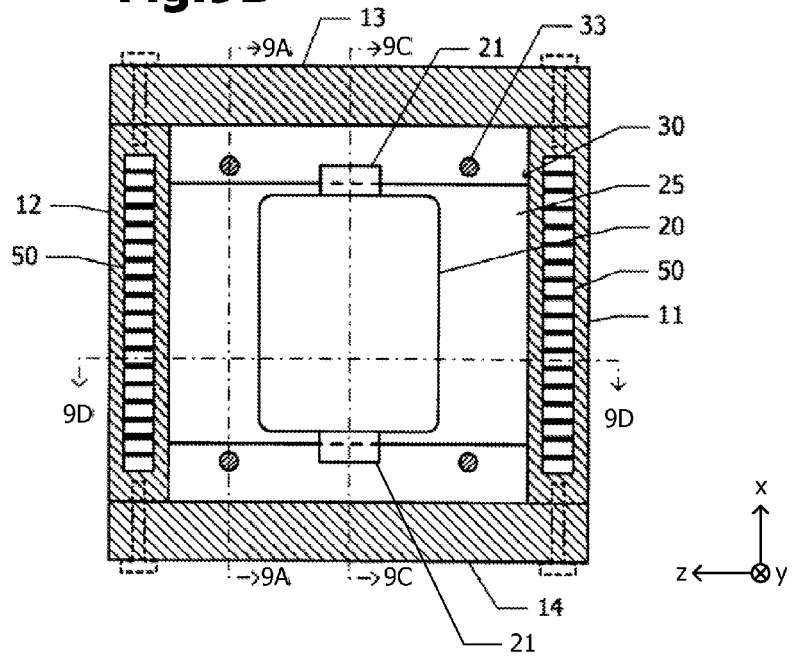
FIG. 9B is a cross-sectional view taken along a one-dot-chain line 9B-9B in FIG. 9A.

FIG. 9B is a cross-sectional view taken along a one-dot-chain line 9B-9B in FIG. 9A. A cross-sectional view taken along a one-dot-chain line 9A-9A in FIG. 9B corresponds to FIG. 9A. A planar shape of the power storage cell 20 and the heat transfer plate 25 is substantially rectangular. The electrode terminals 21 are led out from mutually opposing sides of the power storage cell 20 (upper side and lower side in FIG. 9B). The heat transfer plate 25 extends further outward from the edge of the power storage cell 20 in a planar view.

A pair of cooling plates 11 and 12 serving as the housing are arranged respectively on both sides of the power storage module 30 in the z-direction, that is, so as to interpose the power storage module 30 therebetween in the z-direction. The cooling plates 11 and 12 are in contact with the end surfaces of the heat transfer plates 25. In this manner, each of the heat transfer plates 25 is thermally coupled to the cooling plates 11 and 12. Each of the cooling plates 11 and 12 are fixed to the wallboards 13 and 14 by bolts. The flow path 50 for the coolant's flow is formed inside each of the cooling plates 11 and 12. The power storage device according to the embodiment 2 is composed of the power storage module 30, the cooling plates 11 and 12, and the wallboards 13 and 14 (refer to FIG. 9A).

Figure 9C:
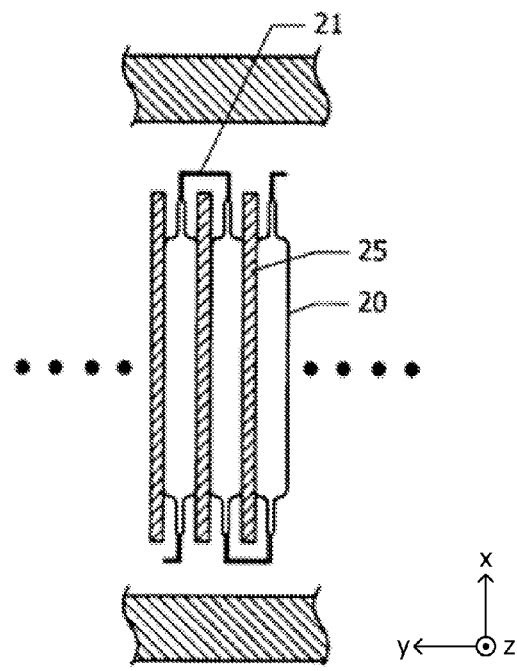
FIGS. 9C and 9D are respectively cross-sectional views taken along one-dot-chain lines 9C-9C and 9D-9D in FIG. 9B.

FIG. 9C is a cross-sectional view taken along a one-dot-chain line 9C-9C in FIG. 9B. The electrode terminals 21 led out from the power storage cells 20 adjacent to each other are connected to each other through the outside of the edge of the heat transfer plate 25.

Figure 9D:
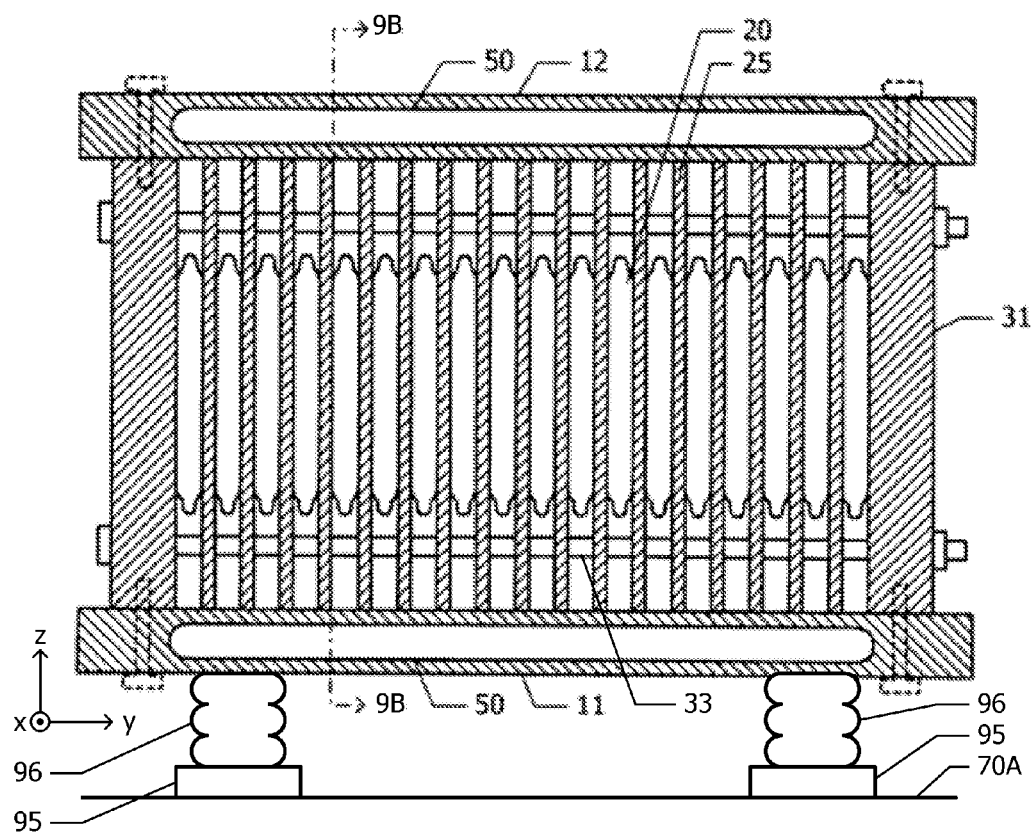

FIG. 9D is a cross-sectional view taken along a one-dot-chain line 9D-9D in FIG. 9B. Each of the heat transfer plates 25 are in contact with the cooling plates 11 and 12 on an end surface thereof. Each of the cooling plates 11 and 12 is fixed to the pushing plates 31 by bolts. The flow path 50 is formed inside each of the cooling plates 11 and 12. The cooling plate 11 serving as a portion of the housing are attached to the turning frame 70A via the damper 96 and the power storage device mount 95.

There are individual differences in a thickness of the power storage cells 20 illustrated in FIGS. 9A and 9D. Therefore, a distance between a pair of the pushing plates 31 varies depending on products. It is possible to absorb the variation by a structure in which the cooling plates 11 and 12 and the wallboards 13 and 14 are in contact with the end surfaces of the pushing plates 31 and a structure in which bolt holes formed in the cooling plates 11 and 12 and the wallboards 13 and 14 are composed of slotted holes which is long in the y-direction.

In the above-described power storage module 30, the tie rods 33 and the pushing plates 31 maintain a shape of the power storage cell stacked body 40 (refer to FIG. 9A) comprised of the power storage cells 20 and the heat transfer plates 25. The pushing plates 31, the cooling plates 11 and 12, and the wallboards 13 and 14 have a parallelepiped structure, and the adjacent wall panels of the parallelepiped structure are fixed by a fastening member such as the bolts. Therefore, it is possible to ensure high rigidity, and the positions of the power storage cells 20 and the heat transfer plates 25 can be restrained with respect to the cooling plates 11 and 12. The power storage cells 20 and the heat transfer plates 25 are firmly fixed so that a relative positional relationship thereof to the cooling plates 11 and 12 is not changed.

In the above-described power storage module 30, the power storage cells 20 and the heat transfer plates 25 are alternately stacked on one another, but the number of the heat transfer plates 25 may be reduced. For example, one heat transfer plate 25 may be arranged for two power storage cells 20. Instead, at least one heat transfer plate 25 may be arranged in a substantially center portion of the stacked power storage cells 20.

In FIGS. 9A to 9D, the highly rigid power storage device obtained by the parallelepiped structure is illustrated. If it is possible to satisfy rigidity or natural frequency which is required for the working machine such as the shovel, the wallboards 13 and 14 may be removed from the structure. Hereinafter, the power storage device from which the wallboards 13 and 14 are removed will be described.

FIG. 10 illustrates a schematic planar shape of the flow path 50 formed inside the cooling plate 11, and a positional relationship between the flow path 50 and the power storage module 30. FIG. 10 illustrates the flow path 50 formed in the cooling plate 11, but the positional relationship between the flow path 50 formed in the cooling plate 12 (refer to FIGS. 9B and 9D) arranged to oppose the cooling plate 11 and the power storage module 30 is the same as the positional relationship between the flow path 50 formed in the cooling plate 11 and the power storage module 30. The flow path 50 includes an inlet port 51a, an introducing path 52a, an expansion path 53a, a main flow path 54, a reduction path 53b, a deriving path 52b and a discharge port 51b, sequentially in this order from an upstream side to a downstream side. The flow path 50 can be formed by aluminum casting.

The inlet port 51a and the discharge port 51b are disposed on an end surface parallel to the zx plane of the cooling plate 11. The coolant entered from the inlet port 51a is introduced into the expansion path 53a through the introducing path 52a. The width of the introducing path 52a is constant.

The expansion path 53a has a shape where the width is broadened toward the downstream side (in a negative direction of the y-axis). The expansion path 53a is disposed to reduce pressure loss occurring when a cross-sectional area of the flow path is rapidly changed. The coolant flowing from the introducing path 52a passes through the expansion path 53a and flows into the main flow path 54.

The main flow path 54 includes first to third sections 54a to 54c, each of which extends in the y-direction and which are arrayed in the x-direction. The main flow path 54 further includes a first curved section 54d which connects a downstream end of the first section 54a and an upstream end of the second section 54b, and a second curved section 54e which connects a downstream end of the second section 54b and an upstream end of the third section 54c. The main flow path 54 has a meandering planar shape as a whole. The coolant flows in the negative direction of the y-axis in the first section 54a, then changes the flowing direction and flows in the positive direction of the y-axis in the second section 54b, then further changes the flowing direction, and flows in the negative direction of the y-axis in the third section 54c.

The reduction path 53b has a planar shape where the width is narrowed toward the downstream side (in the negative direction of the y-axis). The reduction path 53b is disposed to reduce the pressure loss occurring when the cross-sectional area is rapidly changed. The coolant flowing from the main flow path 54 passes through the reduction path 53b and then is discharged from the discharge port 51b through the deriving path 52b. The width of the deriving path 52b is constant.

The expansion path 53a, the main flow path 54 and the reduction path 53b include first to sixth auxiliary flow paths 60a to 60f which are divided in the width direction by first to fifth diaphragms 58a to 58e. The diaphragm 58c arranged in the center among the first to fifth diaphragms 58a to 58e is referred to as a "central wall". In addition, an upstream side end portion of the central wall 58c is arranged on the further upstream side than upstream side end portions of the first and second diaphragms 58a and 58b and the fourth and fifth diaphragms 58d and 58e other than the central wall 58c. The first and second diaphragms 58a and 58b and the fourth and fifth diaphragms 58d and 58e other than the central wall 58c are referred to as "non-central diaphragms". A downstream side end portion of the central wall 58c is arranged on the further downstream side than downstream side end portions of the non-central diaphragms 58a, 58b, 58d and 58e. The non-central diaphragms 58a, 58b, 58d and 58e inside the expansion path 53a are tilted so as to be close to the central wall 58c toward the upstream side. In addition, the non-central diaphragms 58a, 58b, 58d and 58e inside the reduction path 53b are tilted so as to get closer to the central wall 58c toward the downstream side.

The planar shape near the upstream side end portion of the first to fifth diaphragms 58a to 58e are the same as the planar shape near the downstream side end portion thereof. The first to fifth diaphragms 58a to 58e are arranged so that the widths of the first to sixth auxiliary flow paths 60a to 60f inside the main flow path 54 are equal to one another at any position in the direction where the coolant flows. Inside the expansion path 53a, the widths of the first to sixth auxiliary flow paths 60a to 60f are narrowed toward the upstream side. Inside the reduction path 53b, the widths of the first to sixth auxiliary flow paths 60a to 60f are narrowed toward the downstream side.

The power storage module 30 arranged behind the cooling plate 11 is illustrated by a dotted line. The power storage cell stacked body 40 of the power storage module 30 is arranged to be overlapped with the flow path 50, particularly with the main flow path 54, on a plane (xy-plane) along which the cooling plate 11 extends. It is preferable that the first to sixth auxiliary flow paths 60a to 60f of the first to third sections 54a to 54c configuring the main flow path 54 be arranged to be orthogonal to the power storage cell 20.

As illustrated in FIGS. 9B and 9D, the cooling plates 11 and 12 come into contact with the heat transfer plate 25 and are thermally coupled thereto. The compressive force is applied to the power storage cells 20 and the heat transfer plates 25 so as to closely adhere to each other by the tie rods 33 and the pushing plates 31. Therefore, the excellent heat transfer efficiency is ensured between the power storage cell 20 and the heat transfer plate 25. The heat generated from the power storage cell 20 is transmitted to the cooling plates 11 and 12 via the heat transfer plate 25.

A coolant inlet pipe 59a is connected to the inlet port 51a and a coolant discharge pipe 59b is connected to the discharge port 51b. For example, the coolant inlet pipe 59a and the coolant discharge pipe 59b are connected to a cooling pump for circulating the coolant. The coolant flowing from the coolant inlet pipe 59a with a predetermined pressure, for example, cool water, flows in the first to sixth auxiliary flow paths 60a to 60f while absorbing the heat generated by the power storage cells 20 and transmitted to the heat transfer plates 25, and then is discharged from the coolant discharge pipe 59b. In this manner, the power storage cell 20 is cooled.

It is desirable to equally cool the plurality of stacked power storage cells 20. The cooling capacity of the cooling plates 11 and 12 (refer to FIGS. 9B and 9D) is relatively high in a region where the flow rate of the coolant is relatively fast, and is relatively low in a region where the flow rate of the coolant is relatively slow. In order to equally cool the plurality of stacked power storage cells 20, it is desirable to equalize the flow rates of the coolants flowing in the first to sixth auxiliary flow paths 60a to 60f. The present inventors performed simulation analysis on conditions of the coolants flowing in the first to sixth auxiliary flow paths 60a to 60f when the shape of the upstream side end portion of the first to fifth diaphragms 58a to 58e is changed.

Figure 11A:
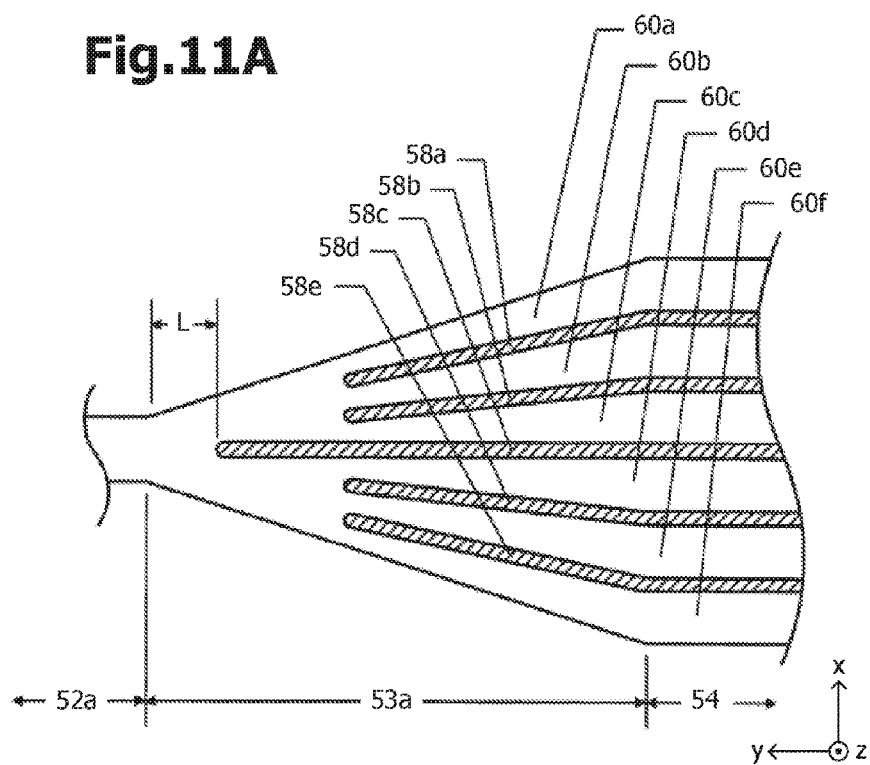
FIG. 11A illustrates a shape of flow paths of samples S1 to S3 subjected to simulation analysis.

FIG. 11A illustrates a shape near the expansion path 53a of samples subjected to the simulation analysis. The present inventors performed the simulation analysis on three samples S1 to S3 in which a distance L between the upstream end of the expansion path 53a (or the downstream end of the introducing path 52a) and the upstream side end portion of the central wall 58c is 150 mm (sample S1), 75 mm (sample S2) and 0 mm (sample S3). In addition, in the respective samples S1 to S3, comparative examination was performed by calculating a ratio (flow rate ratio) of the maximum value to the minimum value of speeds of the coolants flowing in the first to sixth auxiliary flow paths 60a to 60f. The flow rate ratio being close to 1 means that the flow rates of the coolants flowing in the first to sixth auxiliary flow paths 60a to 60f are equal.

Figure 11B:
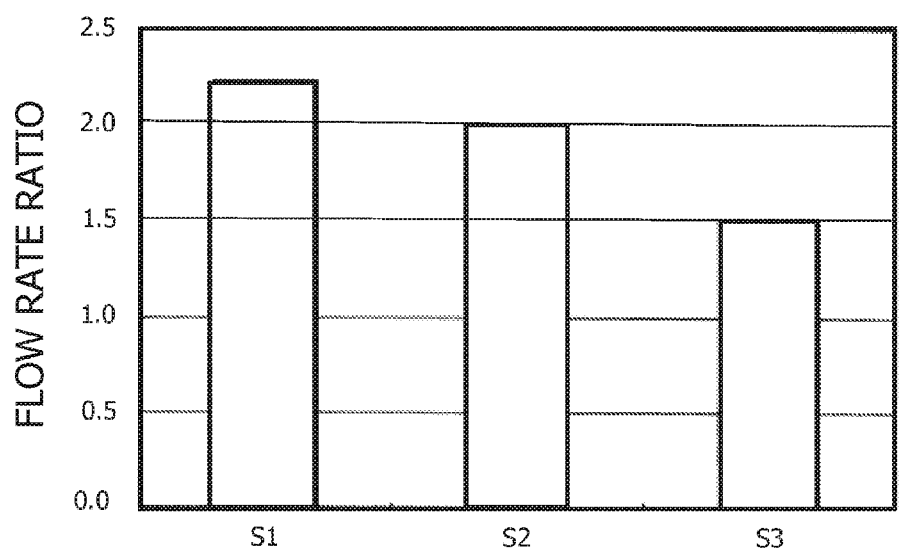
FIG. 11B is a graph illustrating flow rate ratios in the flow path of the samples S1 to S3.

FIG. 11B illustrates the flow rate ratios under conditions that the flow path 50 (refer to FIG. 10) is configured to have any one of the samples S1 to S3. The flow rate ratios in the samples S1 to S3 are respectively approximately 2.2, approximately 2.0 and approximately 1.5. The above-described result showed that the flow rates of the coolants flowing in the first to sixth auxiliary flow paths 60a to 60f are equalized by bringing the upstream side end portion of the central wall 58c to be close to the upstream end of the expansion path 53a.

Figure 12:
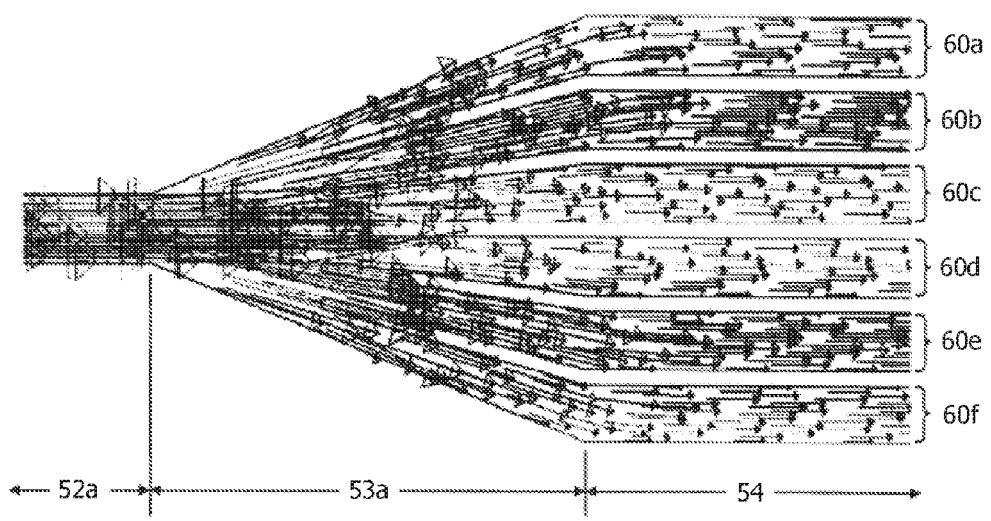
FIG. 12 is a diagram illustrating a simulation analysis result of the sample S3.

FIG. 12 illustrates the simulation result of the sample S3 whose flow rate ratio is relatively small. FIG. 12 is a diagram illustrating the flow of the coolant near the expansion path 53a in the sample S3. A direction, a length and density of a plurality of arrows illustrated in the drawing represent a flowing direction, a flow rate and a flowing volume of the coolant at a start position of the respective arrows. These simulation analysis results show that in a case of the sample S3, the flow rates of the coolants are relatively fast in the second and fifth auxiliary flow paths 60b and 60e, and the flow rates of the coolants are relatively slow in the first, third, fourth and sixth auxiliary flow paths 60a, 60c, 60d and 60f. In addition, the simulation analysis results of the sample S1 whose flow rate ratio is relatively large show that in a case of the sample S1, the flow rates of the coolants are relatively fast in the second to fifth auxiliary flow paths 60b to 60e, and the flow rates of the coolants are relatively slow in the first and sixth auxiliary flow paths 60a and 60f.

In addition, the simulation analysis results of the samples S1 to S3 showed that the flow of the coolant has the following tendency. That is, when the coolant flows from the introducing path 52a into the expansion path 53a, the flow rate of the coolant is fastest near the center in the width direction of the expansion path 53a and slower as it goes closer to the side wall. In addition, the flow rate of the coolant near the center in the width direction of the expansion path 53a gradually becomes slower as the coolant flows toward the downstream side.

Based on this flowing tendency of the coolant, it is considered that the flow rate of the coolant colliding with the upstream side end portion of the central wall 58c becomes relatively faster as the upstream side end portion of the central wall 58c is arranged on the further upstream side, and the flow rate becomes relatively slower as the upstream side end portion of the central wall 58c is arranged on the further downstream side. That is, in the samples S1 to S3, the flow rate of the coolant colliding with the central wall 58c is the fastest in the case of the sample S1, and is the slowest in the case of the sample S3. When the flow rate of the coolant colliding with the central wall 58c is relatively fast, the coolant colliding with the central wall 58c flows to the downstream side while being dispersed so that the flow rate is equalized in the width direction of the expansion path 53a. As a result, it is considered that the flow rates of the coolants flowing into the first to sixth auxiliary flow paths 60a to 60f is equalized.

Figure 13A:
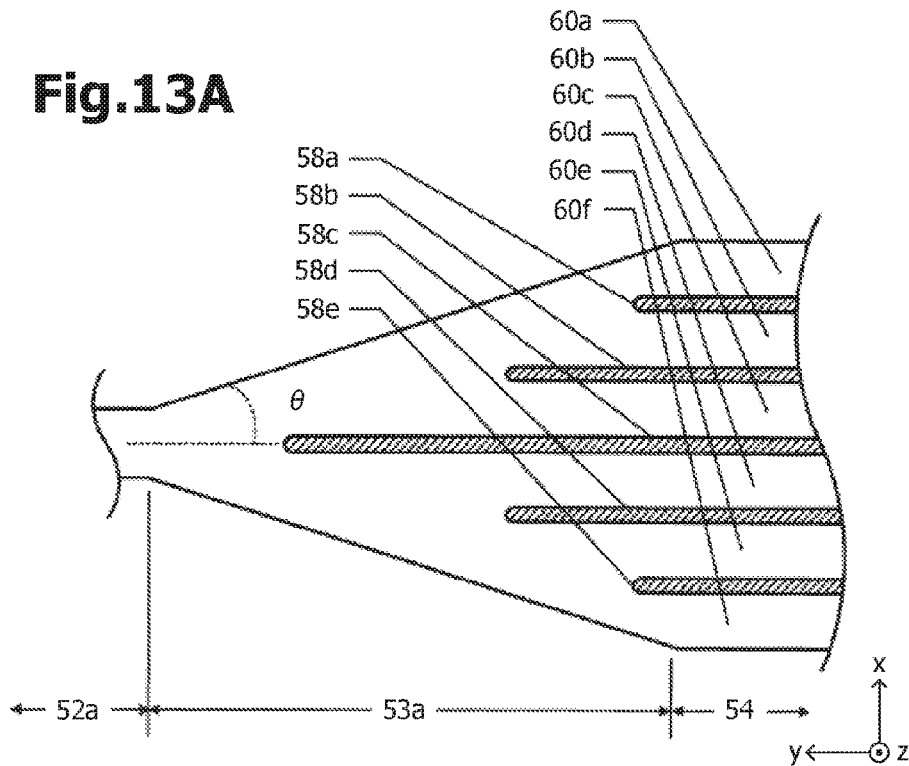
FIGS. 13A and 13B illustrate a planar shape of a flow path according to a modification example of embodiment 2.
Figure 13B:
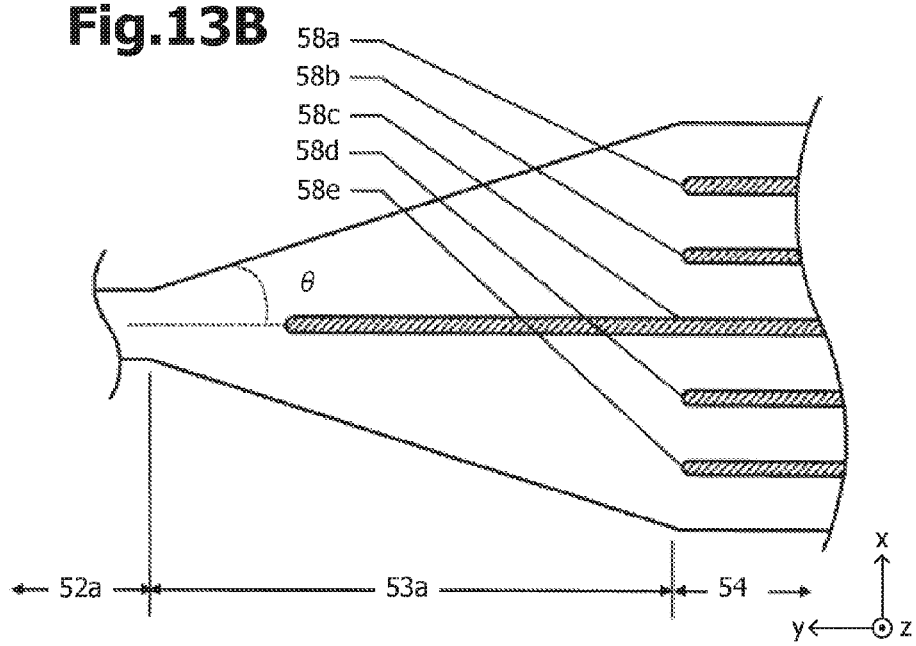

FIGS. 13A and 13B illustrate a planar shape of the flow path according to a modification example of embodiment 2. The above-described simulation analysis results confirmed that in order to equalize the flow rates of the coolants flowing in the first to sixth auxiliary flow paths 60a to 60f, it is effective to arrange the upstream side end portion of the central wall 58c to be located on the further upstream side. Therefore, the shapes of the non-central diaphragms 58a, 58b, 58d and 58e inside the expansion path 53a are not necessarily tilted so as to get closer to the central wall 58c toward the upstream side as illustrated in FIG. 13A. In addition, the upstream side end portion of the non-central diaphragms 58a, 58b, 58d and 58e do not necessarily enter the expansion path 53a as illustrated in FIG. 13B. However, in order to equally introduce the coolant which collides with the upstream side end portion of the central wall 58c to be dispersed near the side wall of the expansion path 53a into the first to sixth auxiliary flow paths 60a to 60f, it is preferable that the non-central diaphragms 58a, 58b, 58d and 58e enter the expansion path 53a as illustrated in FIG. 11A and be tilted so as to get closer to the central wall 58c toward the upstream side. From a viewpoint of reducing the pressure loss occurring when the coolant flows into the expansion path 53a from the introducing path 52a, it is preferable to set tilting (spread half angle) θ of the side wall of the expansion path 53a with respect to the central axis to be 40° or less.

The present inventor subsequently performed simulation analysis on a sample having a shape different from those of the samples S1 to S3.

Figure 14A:
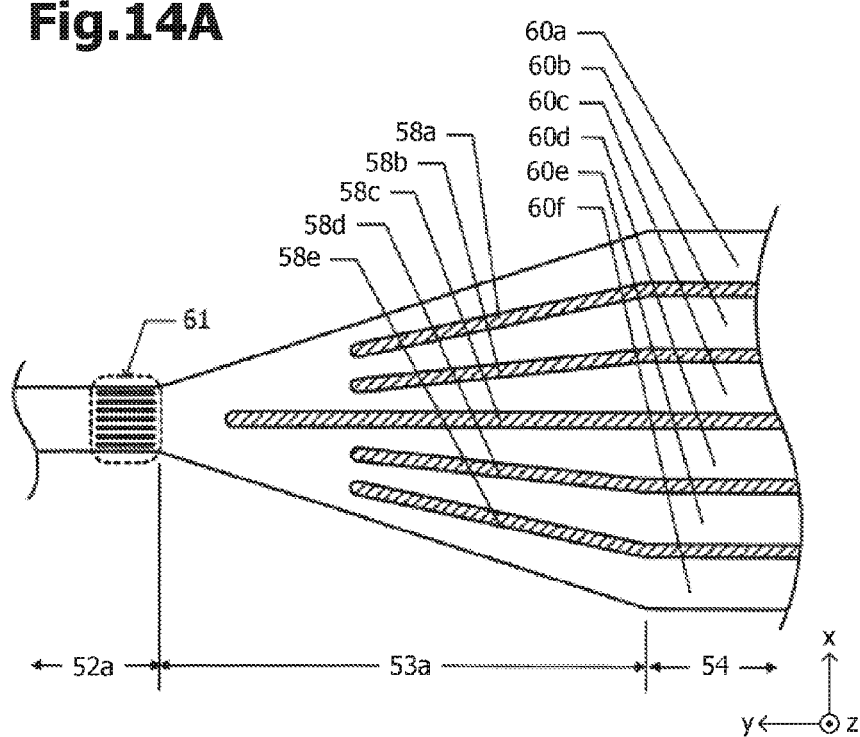
FIG. 14A illustrates a planar shape of a flow path of a sample S4 subjected to simulation analysis.
Figure 14B:
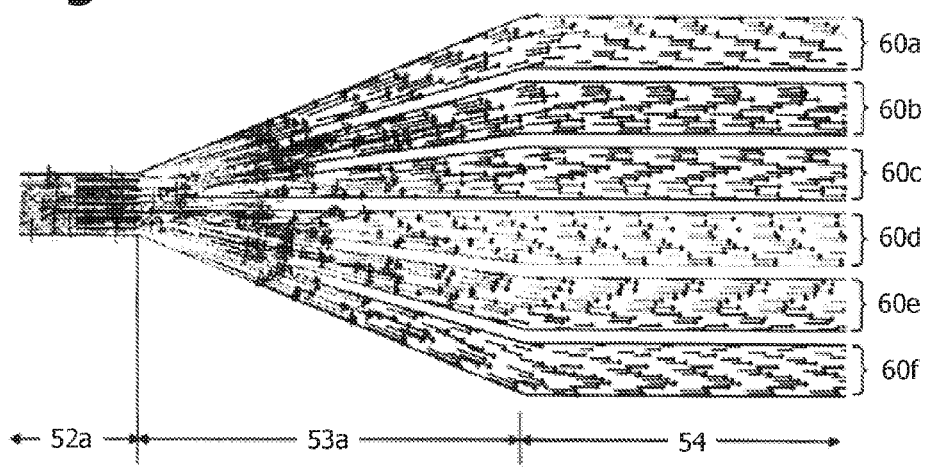
FIG. 14B is a diagram illustrating a simulation analysis result of the sample S4.

FIG. 14A illustrates a planar shape near the expansion path 53a of a sample S4 subjected to the simulation analysis, and FIG. 14B illustrates a result of the simulation analysis. In the sample S4, as illustrated in FIG. 14A, a plurality of partition plates 61 dividing the flow path in the width direction (x-direction) are disposed near the downstream end of the introducing path 52a. The other shape of the flow path is the same as the shape of the flow path in the sample S1.

FIG. 14B illustrates the simulation analysis result of the flow rate of the coolant flowing in the flow path in the sample S4. The result shows that the flow rate ratio of the coolants flowing in the first to sixth auxiliary flow paths 60a to 60f is approximately 1.3. The result showed that disposing the partition plates 61 further improves the flow rate ratio of the coolant flowing in the flow path of the sample S4 as compared to the flow rate ratio (approximately 1.5) of the sample S3.

In addition, based on this simulation analysis result, it is considered that the coolant flowing into the expansion path 53a after passing through the introducing path 52a which is subdivided by the partition plates 61 flows to the downstream side while being dispersed so that the flow rate is equalized in the width direction of the expansion path 53a. The flow rate of the coolant is equalized by disposing the partition plates 61 in the downstream end of the introducing path 52a. Therefore, it is considered that the flow rates of the coolants flowing into the first to sixth auxiliary flow paths 60a to 60f are also equalized.

Figure 15A:
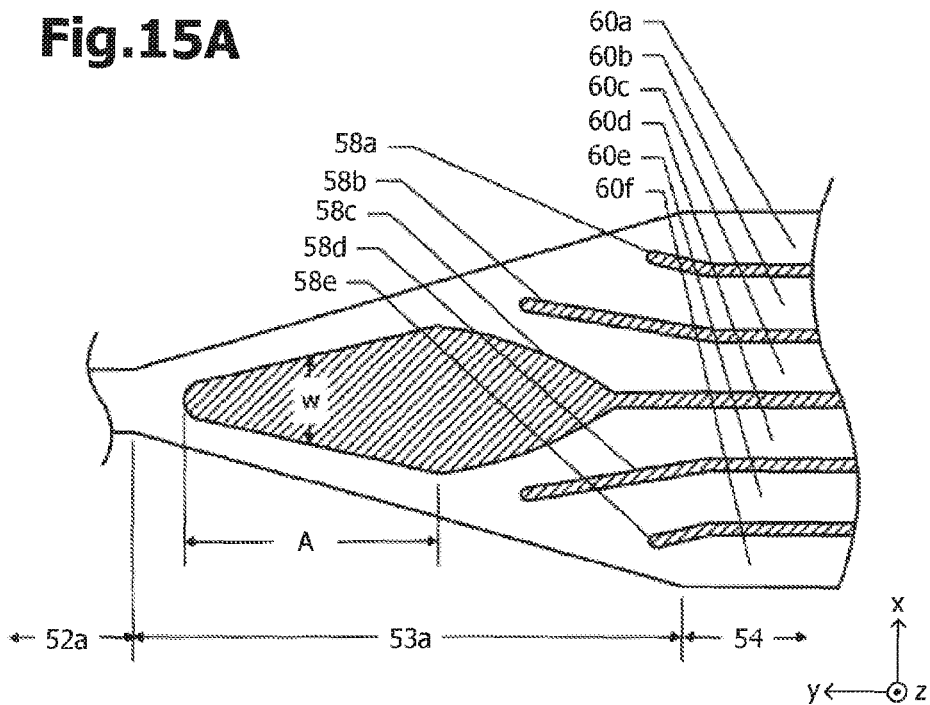
FIG. 15A illustrates a planar shape of a flow path of a sample S5 subjected to simulation analysis.
Figure 15B:
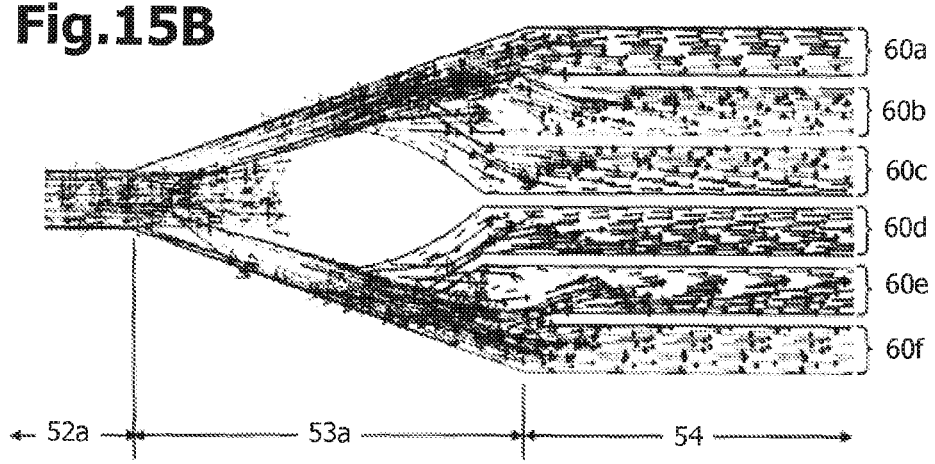
FIG. 15B is a diagram illustrating a simulation analysis result of the sample S5.

FIG. 15A illustrates a planar shape near the expansion path 53a of a sample S5 subjected to the simulation analysis, and FIG. 15B illustrates a result of the simulation result. Hereinafter, a point different from the sample S1 will be described.

In the sample S5, the central wall 58c inside the expansion path 53a has a shape where a width w thereof is broadened from the upper side end portion toward the downstream side and then is narrowed as illustrated in FIG. 15A. The upstream side end portion of the central wall 58c is appropriately rounded. The inside of the central wall 58c inside the expansion path 53a may be hollow. The width of the flow path corresponding to a region A where the width of the central wall 58c is broadened toward the downstream side is gradually broadened toward the downstream side. In addition, the non-central diaphragms 58a, 58b, 58d and 58e are tilted in a portion of the further downstream side than a position where the width of the central wall 58c is maximized, so as to be away from a plane virtually arranged in the center in the width direction of the main flow path 54 toward the upstream side. The coolants flowing after passing through the region A where the width of the central wall 58c is broadened toward the downstream side are respectively and equally introduced into the first to sixth auxiliary flow paths 60a to 60f by the non-central diaphragms 58a, 58b, 58d and 58e being tilted.

FIG. 15B illustrates a result of the performed simulation analysis of the flow rates of the coolants flowing in the first to sixth auxiliary flow paths 60a to 60f in the sample S5. The result showed that the flow rate ratio is approximately 1.2 and is improved as compared to the flow rate ratio (approximately 1.3) of the coolant in the sample S4.

Figure 16A:
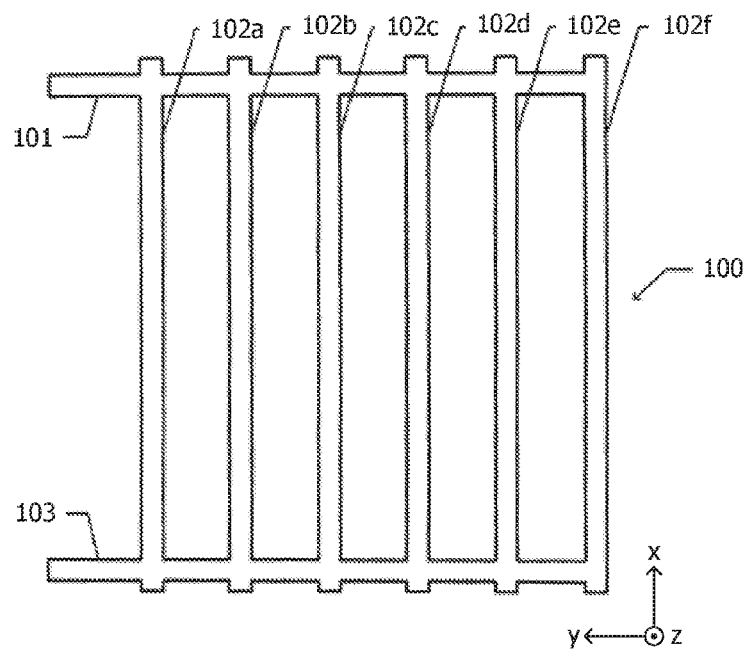
FIG. 16A illustrates a planar shape of a flow path of a comparative example R1 which is subjected to simulation analysis.

The present inventor also performed the simulation analysis on conditions of the coolant flowing in a flow path as illustrated in FIG. 16A, as a comparative example for the above-described samples S1 to S5.

FIG. 16A illustrates a main flow path of a comparative example R1. A main flow path 100 of the comparative example R1 includes an introducing path 101, six auxiliary flow paths 102a to 102f and a discharge path 103. The introducing path 101 and the discharge path 103 respectively extend along the y-direction. The auxiliary flow paths 102a to 102e extend in the x-direction and are arrayed with a predetermined pitch in the y-direction. The auxiliary flow paths 102a to 102e are connected to the introducing path 101 and the discharge path 103 by intersecting the introducing path 101 and the discharge path 103, at both ends thereof. The coolant flowing in the introducing path 101 passes through the auxiliary flow paths 102a to 102f and is discharged from the discharge path 103. The simulation analysis result showed that the flow rate ratio of the coolant flowing in the auxiliary flow paths 102a to 102f is equal to or higher than 6.

Figure 16B:
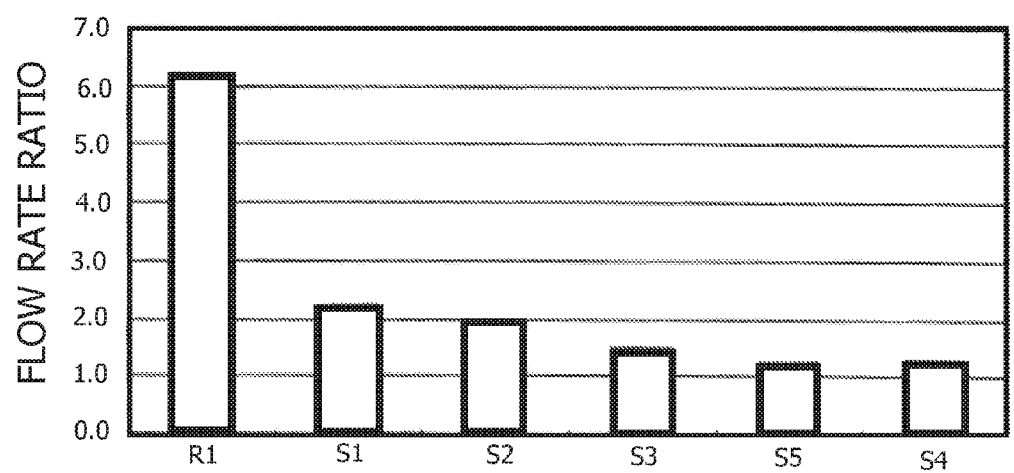
FIG. 16B is a graph illustrating flow rate ratios inside the flow path of the comparative example R1 and the samples S1 to S5.

FIG. 16B illustrates a graph comparing the flow rate ratios of the coolants flowing in the auxiliary flow paths in the comparative example R1 and the samples S1 to S5. The graph showed that the flow rate ratios in the samples S1 to S5 which have the structure according to the embodiment 2 are significantly smaller than the flow rate ratio of the comparative example R1. The above-described simulation analysis confirmed effectiveness in the structure of the flow path according to the embodiment 2.

Embodiment 3

Figure 17:
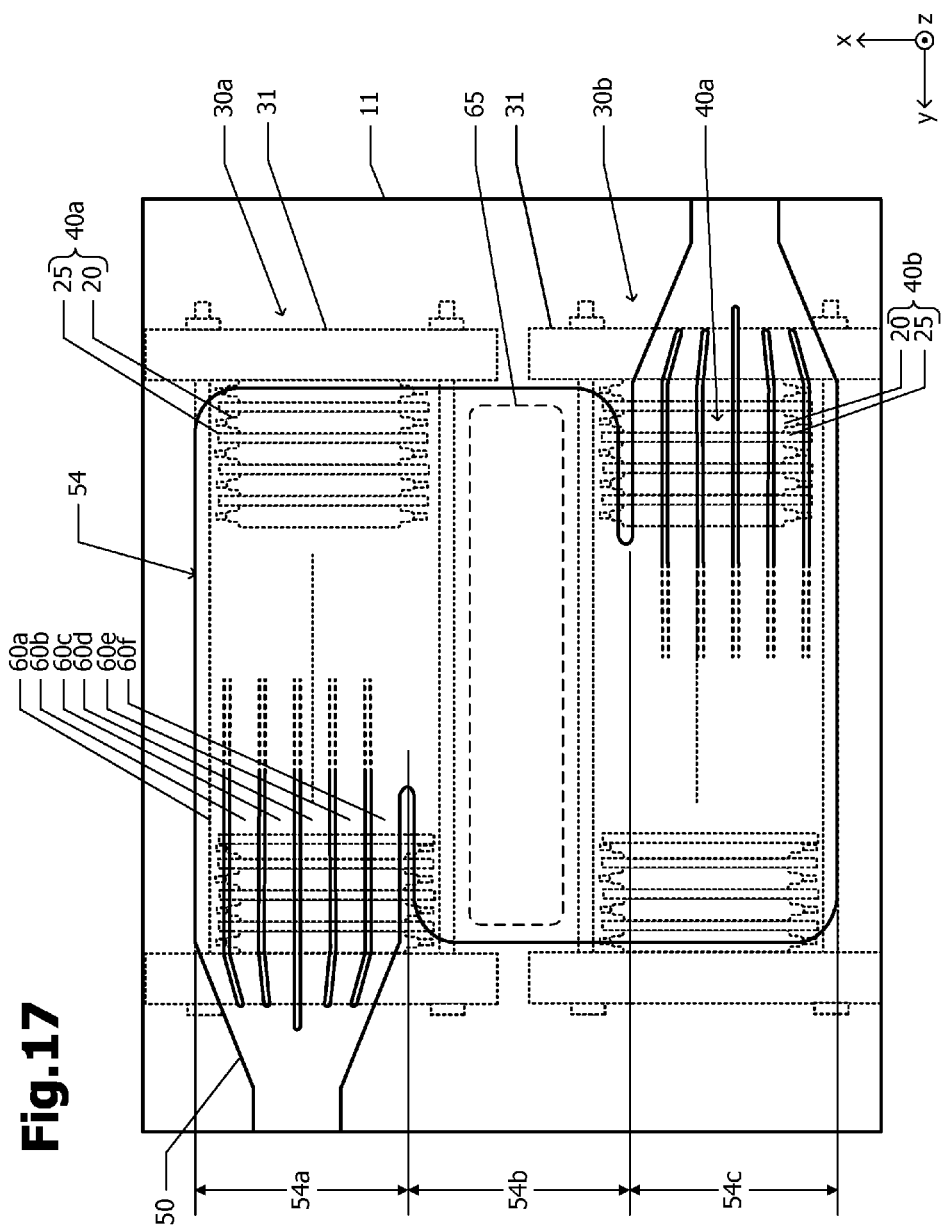
FIG. 17 is a plan view of a power storage device according to embodiment 3.

FIG. 17 is a plan view of a power storage device according to embodiment 3. Hereinafter, points different from the embodiment 2 will be described, and explanation about the same configuration will be omitted. In the embodiment 3, a plurality of storage modules are arranged for a set of the cooling plates 11 and 12 (refer to FIGS. 9B and 9D). The cooling plates 11 and 12 can be considered as the bottom panel 120 and the upper panel 140 of the power storage device according to the embodiment 1 as illustrated in FIGS. 3A and 3B. A first power storage module 30a and a second power storage module 30b which are arranged behind the cooling plate 11 are illustrated by dotted lines. The first and second power storage modules 30a and 30b respectively have a configuration which is the same as that of the power storage module 30 (refer to FIG. 9A) described in the embodiment 2.

The cooling plate 11 is in contact with an end surface of the heat transfer plates 25 of the first and second power storage modules 30a and 30b. In this manner, the heat transfer plates 25 of the first and second power storage modules 30a and 30b are thermally coupled to the cooling plate 11. The cooling plate 11 is fixed to the pushing plates 31 of the first and second power storage modules 30a and 30b by fasteners such as bolts. In this manner, the cooling plate 11 and the power storage cells 20 included in the first and second power storage modules 30a and 30b are fixed to each other so that a relative positional relationship is not changed.

The power storage cell stacked body 40a included in the first power storage module 30a is arranged to be overlapped with the flow path 50 disposed in the cooling plate 11 in a planar view (with a line of sight which is perpendicular to the cooling plate 11), to be overlapped particularly with an upper region in FIG. 17 of the region where the main flow path 54 is arranged (region where the first section 54a is mainly arranged). In addition, the power storage cell stacked body 40b included in the second power storage module 30b is arranged to be overlapped with the flow path 50 in the planar view, to be overlapped particularly with lower region in FIG. 17 of the region where the main flow path 54 is arranged (region where the third section 54c is mainly arranged). In this manner, it is possible to cool the plurality of power storage modules using a set of the cooling plates by arranging the plurality of power storage modules 30a and 30b so as to be overlapped with the region where the main flow path 54 of the cooling plate 11 is arranged.

Embodiment 4

In the power storage device including the plurality of power storage modules, a clearance region 65 (refer to FIG. 17) where the power storage cell serving as a heating source is not arranged can be formed between the power storage modules. The coolant flowing in a region overlapped with the clearance region 65 within the flow path 50, specifically, a portion of the coolant flowing in the second section 54b of the main flow path 54 in FIG. 17 does not efficiently contribute to cooling of the power storage modules. In this case, it is preferable to respectively arrange the first to sixth auxiliary flow paths 60a to 60f within the second section 54b to be overlapped with either the first power storage module 30a or the second power storage module 30b.

Figure 18:
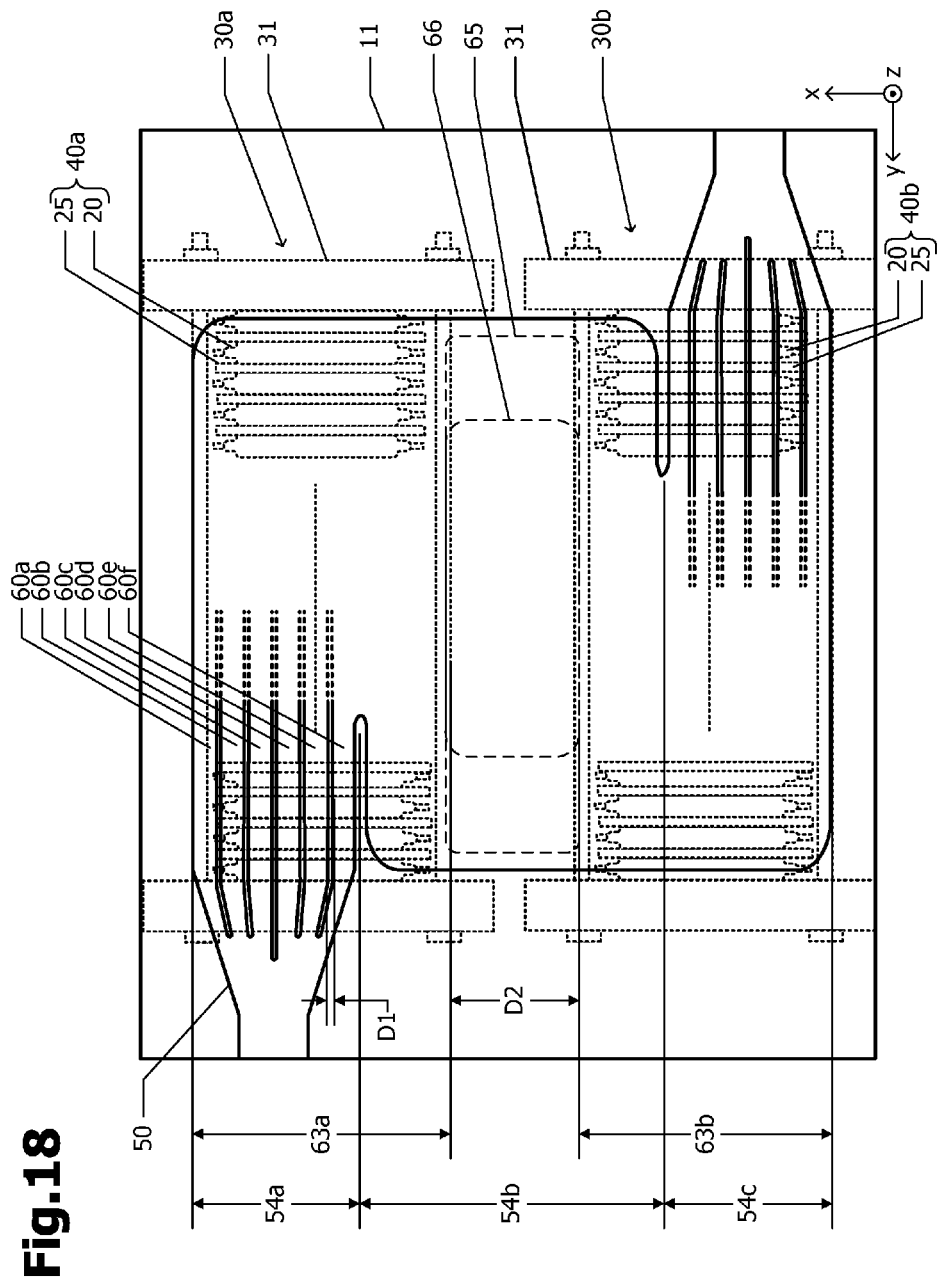
FIG. 18 is a plan view of a power storage device according to embodiment 4.

FIG. 18 is a plan view of a power storage device according to embodiment 4. Hereinafter, points different from embodiment 3 as illustrated in FIG. 17 will be described, and the explanation about the same configuration will be omitted. The first to sixth auxiliary flow paths 60a to 60f respectively include y-direction flow paths which cause the coolant to flow in the y-direction. The plurality of y-direction flow paths are arrayed in the x-direction. Six y-direction flow paths are respectively arranged in the first section 54a, the second section 54b and the third section 54c, and a total of eighteen y-direction flow paths are arranged side by side in the x-direction. A region including half of the y-direction flow paths which are arranged on a positive side of the x-axis among the eighteen y-direction flow paths is referred to as a first cooling region 63a, and a region including the remaining half of the y-direction flow paths which are arranged on a negative side of the x-axis is referred to as a second cooling region 63b. Within the first cooling region 63a and the second cooling region 63b, a gap between the mutually adjacent y-direction flow paths is referred to as D1. A gap between the first cooling region 63a and the second cooling region 63b is referred to as D2. The gap D2 is larger than the gap D1. Neither of the first to sixth auxiliary flow paths 60a to 60f are arranged in a partial region 66 of a region surrounded by an outer peripheral line of the flow path 50, the partial region 66 being disposed between the first cooling region 63a and the second cooling region 63b.

The gap D2 between the first cooling region 63a and the second cooling region 63b is set to correspond to the gap (width of the clearance region 65) between the power storage cell stacked body 40a of the first power storage module 30a and the power storage cell stacked body 40b of the second power storage module 30b. The power storage cell stacked body 40a of the first power storage module 30a is arranged so as to be overlapped with the first cooling region 63a of the cooling plate 11, and the power storage cell stacked body 40b of the second power storage module 30b is arranged so as to be overlapped with the second cooling region 63b of the cooling plate 11. In this manner, it is possible to efficiently cool the plurality of power storage cell stacked bodies using a set of the cooling plates by arranging the power storage cell stacked bodies of the plurality of power storage modules so as to be respectively overlapped with the cooling regions of the cooling plate. In addition, forming the flow path having this shape substantially equalizes the lengths from an entrance portion to an exit portion of the first to sixth auxiliary flow paths 60a to 60f. Therefore, it is possible to equalize an amount of the heat absorbed by the coolants respectively flowing in the first to sixth auxiliary flow paths 60a to 60f.

Here, the region including half of the y-direction flow paths which are arranged on the positive side of the x-axis, among the plurality of y-direction flow paths, is defined as the first cooling region 63a, and the region including the remaining half of the y-direction flow paths which are arranged on the negative side of the x-axis is defined as the second cooling region 63b. However, a defining method of the cooling region is not limited thereto. In FIG. 18, for example, the number of the y-direction flow paths included in the first cooling region 63a may be different from the number of the y-direction flow paths included in the second cooling region 63b. It is preferable that the maximum value of the gap (that is, D2) in the plurality of y-direction flow paths is equal to or larger than eight times a value of the second largest gap, and it is preferable that the gap having the maximum value be defined by the y-direction flow paths of the second section 54b.

The plurality of auxiliary flow paths (y-direction flow paths) included in the second section 54b are classified into a first group relatively close to the first section 54a and a second group relatively close to the third section 54c. In this case, a gap between the y-direction flow path of the first group and the y-direction flow path of the second group corresponds to D2. A gap between the first section 54a and the second section 54b, and a gap between the second section 54b and the third section 54c correspond to D1.

Embodiment 5

Figure 19A:
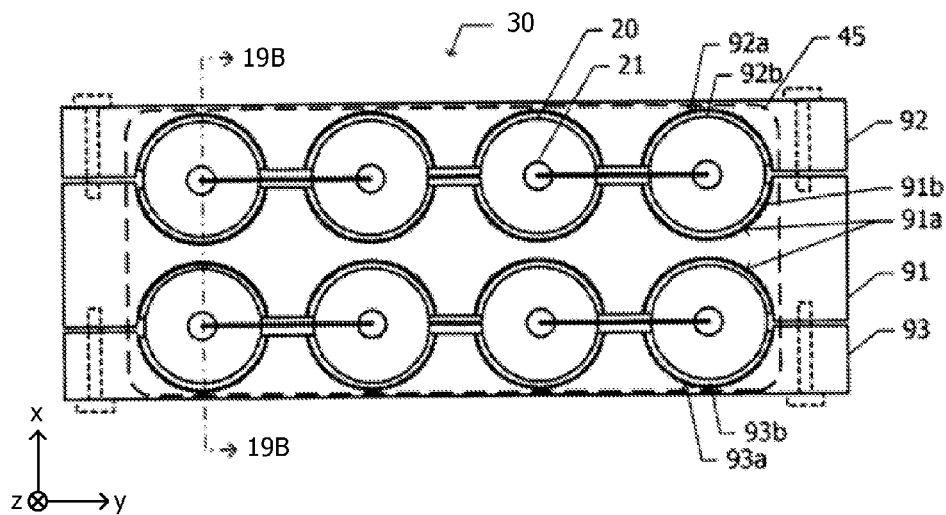
FIG. 19A is a plan view of a power storage device according to embodiment 5.

FIG. 19A is a cross-sectional view of a power storage device according to embodiment 5. The power storage cell 20 has a cylindrical appearance, a central axis thereof is parallel to the z-direction, and end surfaces thereof are parallel to the xy-plane. The electrode terminals 21 are respectively attached to both side end surfaces of the power storage cell 20. One of the electrode terminals 21 is the positive electrode and the other is the negative electrode. The plurality of power storage cells 20 are arranged in a matrix shape in the x-direction and the y-direction. In FIG. 19A, eight power storage cells 20 are arranged in the matrix shape of two rows and four columns, two being arranged in the x-direction and four being arranged in the y-direction. The plurality of power storage cells 20 are electrically connected in series via the electrode terminals 21 thereof. For example, as each of the power storage cells 20, it is possible to use an electric double layer capacitor which has high capacity and is excellent in quick charging and discharging properties.

The power storage cells 20 are supported by a holder 91 and fixing plates 92 and 93. For example, the holder 91 has an appearance of a parallelepiped aluminum member with a plurality of recesses 91a having a semi-cylindrical shape aligned with a portion of the side surface of the power storage cell 20. A portion of the power storage cells 20 is accommodated in the recesses 91a of the holder 91. The recesses 91a of the holder 91 and the side surfaces accommodated in the recesses 91a of the power storage cells 20 are joined by a joining member 91b which has excellent thermal conductivity and electrical insulation performance.

Recesses 92a and 93a respectively aligned with the portion of the side surfaces of the power storage cells 20 are formed in the fixing plates 92 and 93. Each of the power storage cells 20 is interposed between the recesses 92a or 93a and the recess 91a of the holder 91. For example, the fixing plates 92 and 93 are formed of aluminum. The recess 92a of the fixing plate 92 and the side surface of the power storage cell 20 are joined by a joining member 92b which has excellent thermal conductivity and electrical insulation performance. Similarly, the recess 93a of the fixing plate 93 and the side surface of the power storage cell 20 are joined by a joining member 93b which has the excellent thermal conductivity and the electrical insulation performance.

The fixing plates 92 and 93 are fixed to the holder 91 by bolts. The power storage cell 20s closely adhere to the holder 91 and the fixing plates 92 and 93 via the joining members 91b, 92b and 93b. The power storage module 30 is comprised of the power storage cells 20, the holder 91 and the fixing plates 92 and 93. A structure obtained by arranging the plurality of power storage cells 20 in two rows is referred to as a power storage cell assembly 45.

Figure 19B:
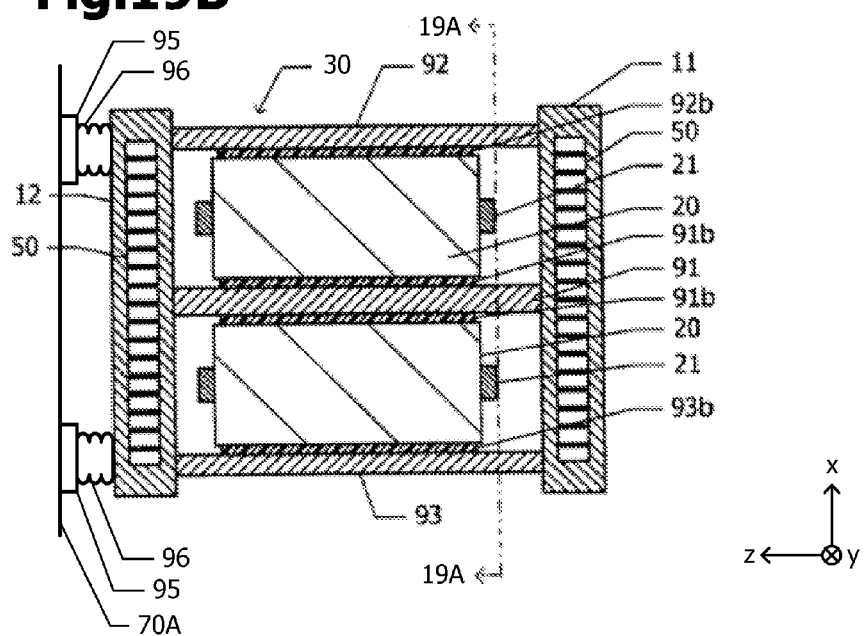
FIG. 19B is a cross-sectional view taken along a one-dot-chain line 19B-19B in FIG. 19A.

FIG. 19B is a cross-sectional view taken along a one-dot-chain line 19B-19B in FIG. 19A. The cross-sectional view taken along the one-dot-chain line 19A-19A of FIG. 19B corresponds to FIG. 19A.

The holder 91 and the fixing plates 92 and 93 extend further outward from the electrode terminals 21 of the power storage cells 20 in the z-direction. A pair of the cooling plates 11 and 12 are arranged so as to interpose the holder 91 and the fixing plates 92 and 93 therebetween in the z-direction. The cooling plate 12 is attached to the turning frame 70A via the damper 96 and the power storage device mount 95. The cooling plates 11 and 12 are in contact with the end surfaces of the holder 91 and the fixing plates 92 and 93. In this manner, the holder 91 and the fixing plates 92 and 93 are thermally coupled to the cooling plates 11 and 12.

The holder 91 and the fixing plates 92 and 93 surround the power storage cell 20 via the joining members 91b, 92b and 93b. Therefore, the heat generated in the power storage cell 20 is efficiently transferred to the holder 91 and the fixing plates 92 and 93. In addition, the holder 91 and the fixing plates 92 and 93 have a shape for filling a space among the plurality of power storage cells 20, thereby coming into contact with the cooling plates 11 and 12 through a wide area. Therefore, the heat is efficiently transferred to the cooling plates 11 and 12 from to the holder 91 and the fixing plates 92 and 93. Since the heat transfer efficiency is improved from the power storage cells 20 to the cooling plates 11 and 12, the cooling plates 11 and 12 can efficiently cool the power storage cells 20.

FIGS. 19A and 19B illustrate an example where the electrode terminals 21 are respectively arranged on both side end surfaces of the power storage cell 20. Instead, two electrode terminals 21 having the positive electrode and the negative electrode may be disposed on one end surface of the power storage cell 20. According to this configuration of the power storage cell 20, it is possible to bring the holder 91 or the fixing plates 92 and 93 into contact with the end surface of the power storage cell 20 having no electrode terminal 21. Therefore, it is possible to more efficiently cool the power storage cell 20.

Embodiment 6

Figure 20:
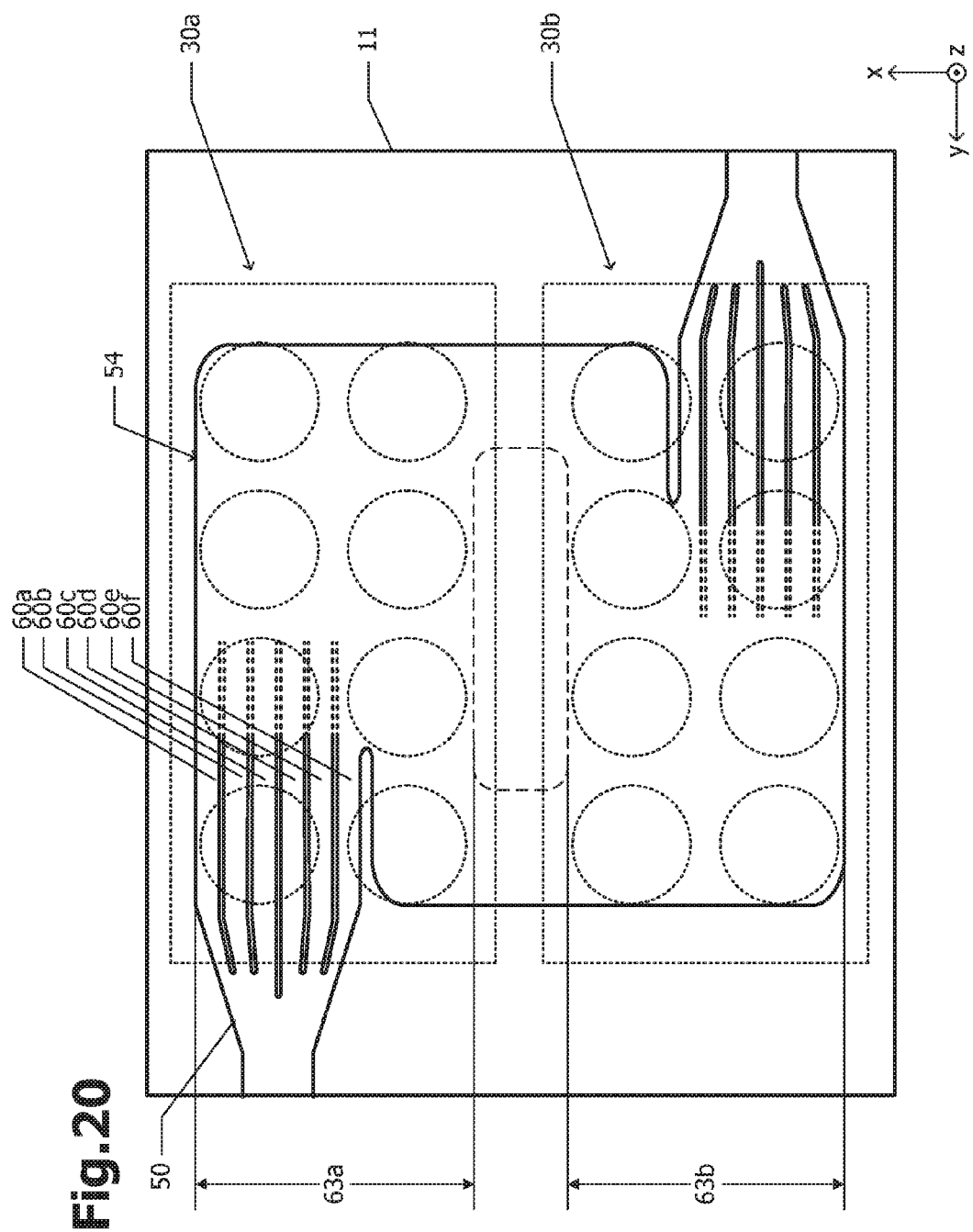
FIG. 20 is a plan view of a power storage device according to embodiment 6.

FIG. 20 is a plan view of a power storage device according to embodiment 6. Hereinafter, points different from the embodiment 5 will be described, and the explanation about the same configuration will be omitted.

In the embodiment 6, a plurality of power storage modules are combined for a set of the cooling plates 11 and 12. Hereinafter, a positional relationship between one cooling plate 11 out of a set of the cooling plates 11 and 12 and the first and second power storage modules 30a and 30b will be described. A relationship between the cooling plate 12 (refer to FIG. 19B) and the first and second power storage modules 30a and 30b is the same as the relationship between the cooling plate 11 and the first and second power storage modules 30a and 30b. The first power storage module 30a and the second power storage module 30b which are arranged behind the cooling plate 11 are illustrated by dotted lines. The flow path 50 is formed in the cooling plate 11. A planar shape of the flow path 50 is the same as a planar shape of the flow path 50 of the embodiment 4 illustrated in FIG. 18. Similar to the case of the embodiment 4 illustrated in FIG. 18, a region having the main flow path 54 is divided into the first cooling region 63a and the second cooling region 63b.

The cooling plate 11 comes into contact with the end surfaces of the holder and the fixing plates of the first and second power storage modules 30a and 30b so as to be thermally coupled to the holder and the fixing plates. The first power storage module 30a is arranged to be overlapped with the first cooling region 63a of the cooling plate 11. The second power storage module 30b is arranged to be overlapped with the second cooling region 63b of the cooling plate 11. The cooling plate 11 is fixed to the first and second power storage modules 30a and 30b near the end portion in the y-direction thereof by fasteners such as bolts. In this manner, it is possible to more efficiently cool the plurality of power storage modules using a set of the cooling plates by arranging the plurality of power storage modules to be respectively overlapped with the plurality of cooling regions of the cooling plate.

Hitherto, the present invention has been described with reference to the embodiments, but the present invention is not limited thereto. For example, it is apparent to those skilled in the art that the embodiments can be modified, improved and combined with one another in various ways.

Based on the above-described embodiments, the invention described in the following appendixes is disclosed.

Appendix 1

There is provided a power storage device including:
a housing having a first wallboard in which a first flow path for coolant's flow is formed;
a power storage module which is arranged inside the housing, and in which a plurality of power storage cells are stacked on one another and each of the power storage cells is thermally coupled to the first flow path; and
an electric part which is arranged inside the housing and is electrically connected to the power storage module.

Appendix 2

In the power storage device according to Appendix 1, the housing further has a second wallboard opposing the first wallboard, a second flow path for the coolant's flow is formed in the second wallboard, and the power storage cells are thermally coupled to the second flow path.

Appendix 3

In the power storage device according to Appendix 1 or 2, the power storage module has a plurality of heat transfer plates arranged between the power storage cells, and the heat transfer plates are thermally coupled to the first wallboard and the second wallboard via end surfaces thereof. The housing includes a pressurizing mechanism which generates a force acting in a direction where the first wallboard and the second wallboard get closer to each other, and the force acting in the direction where the first wallboard and the second wallboard get closer to each other improves heat transfer efficiency between each of the heat transfer plates and the first wallboard, and between each of the heat transfer plates and the second wallboard.

Appendix 4

In the power storage device according to any one of Appendixes 1 to 3, the housing hermetically isolates a space for accommodating the power storage module and the electrical part from an external space.

Appendix 5

In the power storage device according to any one of Appendixes 1 to 4, the first wallboard includes:
a first member which has a groove configuring the first flow path on an outer surface thereof; and
a second member which covers the outer surface of the first member and closes an opening of the groove to configure the first flow path.

Appendix 6

In the power storage device according to any one of Appendixes 1 to 5, the power storage module is accommodated inside the housing so as not to be slidable with respect to the housing.

Appendix 7

There is provided a power storage module including power storage cells and a cooling plate which is thermally coupled to the power storage cells and which includes a flow path where a coolant for cooling the power storage cells flows. When defining an xy-orthogonal coordinate system, the flow path includes a synthetic flow path meandering so as to make the coolant flow in a y-positive direction, then to change a flowing direction thereof to flow in a y-negative direction, and further to change the flowing direction to flow in the y-positive direction. The synthetic flow path is divided into a plurality of auxiliary flow paths in a width direction intersecting the flowing direction of the coolant. The power storage cells are arranged to be overlapped with a region on an xy-plane, where the synthetic flow path of the cooling plate is arranged.

Appendix 8

In the power storage module according to Appendix 7, the plurality of auxiliary flow paths respectively have a plurality of y-direction flow paths which make the coolant flow in a y-direction and are arrayed in an x-direction. The maximum value of a gap where the y-direction flow paths included in the plurality of auxiliary flow paths are adjacent to each other in the x-direction is eight or more times a value of the second largest gap, and the gap having the maximum value is defined by the y-direction flow paths which make the coolant flow in the y-negative direction. The cooling plate has a first cooling region corresponding to the plurality of y-direction flow paths arranged on one side of the gap having the maximum value, and a second cooling region corresponding to the plurality of y-direction flow paths arranged on the other side. The power storage cells include first and second power storage cells, the first power storage cells are arranged to be overlapped with the first cooling region of the cooling plate on the xy plane, and the second power storage cells are arranged to be overlapped with the second cooling region of the cooling plate on the xy plane.

Appendix 9

In the power storage module according to Appendix 7 or 8, an upstream side end portion of the synthetic flow path has a shape whose width is narrowed toward an upstream side, and upstream side end portions of the plurality of auxiliary flow paths dividing the synthetic flow path merge into a single flow path while widths thereof are narrowed toward the upstream side.

Appendix 10

In the power storage module according to any one of Appendixes 7 to 9, a downstream side end portion of the synthetic flow path has a shape whose width is narrowed toward a downstream side, and downstream side end portions of the plurality of auxiliary flow paths dividing the synthetic flow path merge into a single flow path while widths thereof are narrowed toward the downstream side.

Appendix 11

In the power storage module according to any one of Appendixes 7 to 10, the cooling plate and each of the power storage cells are coupled to each other so that a relative positional relationship is not changed.

Appendix 12

There is provided a power storage module including power storage cells; and a cooling plate which is thermally coupled to the power storage cells and has a flow path of a coolant for cooling the power storage cells.

The cooling plate includes:

an expansion path whose width is broadened from an upstream side toward a downstream side;

a main flow path which is disposed to be connected to a downstream end of the expansion path; and a plurality of diaphragms which divide the main flow path in a width direction thereof and partition the main flow path into a plurality of auxiliary flow paths.

An upstream side end portion of a central wall disposed in the center among the plurality of diaphragms is arranged on the further upstream side than an upstream side end portion of non-central diaphragms other than the central wall.

Appendix 13

In the power storage module according to Appendix 12, the upstream side end portion of the central wall enters the expansion path.

Appendix 14

In the power storage module according to Appendix 13, the upstream side end portion of the central wall is arranged at an upstream end of the expansion path.

Appendix 15

In the power storage module according to any one of Appendixes 12 to 14, the upstream side end portions of the non-central diaphragms are arranged to enter the expansion path.

Appendix 16

In the power storage module according to Appendix 15, the non-central diaphragms in the expansion path are tilted so as to get closer to the central wall toward the upstream side.

Appendix 17

In the power storage module according to any one of Appendixes 12 to 16, the plurality of diaphragms are arranged so that respective widths of the auxiliary flow paths are equal to one another at any position in a direction where the coolant flows.

Appendix 18

The power storage module according to any one of Appendixes 12 to 17 further includes:

an introducing path which is disposed to be connected to the upstream end of the expansion path; and a plurality of partition plates which are arranged in a downstream end of the introducing path and divide a downstream side end portion of the introducing path in a width direction thereof.

Appendix 19

In the power storage module according to Appendix 13, the central wall in the expansion path has a shape whose width is broadened from the upstream side end portion to the downstream side and then is narrowed. The non-central diaphragms are tilted in a portion of the further downstream side than a position where the width of the central wall is maximized, so as to be away from a plane virtually arranged in the center in the width direction of the main flow path toward the upstream side.

Appendix 20

In the power storage module according to any one of Appendixes 12 to 19, in a planar cross-section of the expansion path, a side wall of the expansion path is linearly disposed to be tilted with respect to a central axis of the expansion path by 40° or less.

What is claimed is:

1. A shovel comprising:
    a lower travelling body;
    an upper turning body that is pivotally mounted on the lower travelling body;
    an attachment that is arranged in the upper turning body;
    a power storage device that is arranged in the upper turning body together with the attachment; and
    an electric part that is driven by a discharge power from the power storage device,
    wherein the power storage device comprises:
    a housing; and
    a first power storage module,
    wherein the housing has a box shape including a bottom panel, an upper panel and side panels, a space in the housing being isolated from the outside of the housing and has a first flow path for cooling water in one of the bottom panel and the upper panel, wherein the first power storage module is fixed inside the housing, and includes a plurality of power storage cells, a plurality of heat transfer plates and a pair of pushing plates, the power storage cells and the heat transfer plates being arranged in a line, the pushing plates applying compressive force to a structure having the power storage cells and the heat transfer plates, the heat transfer plates being thermally coupled to the bottom panel and the upper panel on lower end surfaces and upper end surfaces of the heat transfer plates, respectively, the plurality of power storage cells, the plurality of heat transfer plates and the pair of pushing plates being apart from the side panels, and wherein the housing includes a pressurizing mechanism generating a force acting in a direction in which the bottom panel and the upper panel get closer to each other in such a manner that the bottom panel and the upper panel apply compressive force to the heat transfer plates and that the lower end surfaces and the upper end surfaces of the heat transfer plates are respectively adhered to the bottom panel and the upper panel directly or via heat transfer rubber sheets.

2. The shovel according to claim 1, wherein electrode terminals are drawn from the power storage cells towards the side panels.

3. The shovel according to claim 1, wherein the power storage cells are connected in series outside of edges of the heat transfer plates.

4. The shovel according to claim 1, wherein the power storage cells, the heat transfer plates, and the pushing plates are exposed on a side surface of the first power storage module.

5. The shovel according to claim 1, wherein a lower end of each of the pushing plates is bent at a bent portion in an L-shape, and a tip portion outside of the bent portion of each of the pushing plates is fixedly screwed to the bottom panel of the lower housing.

6. The shovel according to claim 1,
wherein the compressive force applied by the pressurizing mechanism improves heat transfer efficiency between the heat transfer plates and the bottom panel, and between the heat transfer plates and the upper panel.

7. The shovel according to claim 1,
wherein the housing further comprises a second flow path which is formed in one of the bottom panel and the upper panel, not having the first flow path therein, and
wherein the power storage cells are thermally coupled to the second flow path.

8. The shovel according to claim 1,
wherein the first power storage module is accommodated inside the housing so as not to be slidable with respect to the housing, and
wherein the housing is attached to the upper turning body via a vibration control device.

9. The shovel according to claim 1, wherein
the housing includes a lower housing and an upper housing,
wherein the lower housing includes the bottom panel, lower side panels which are parts of the side panels, and a flange provided at an upper end of the lower side panels, wherein the upper housing includes the upper panel, upper side panels which are parts of the side panels, and a flange provided at a lower end of the upper side panels, and wherein the pressurizing mechanism comprises a fastener penetrating the flange of the upper housing and the flange of the lower housing.

10. The shovel according to claim 1,
wherein the power storage device further comprises a second power storage module which is arranged inside the housing, and includes other power storage cells, other heat transfer plates and other pushing plates, the other power storage cells and the other heat transfer plates of the second power storage module being arranged in a line, the other pushing plates of the second power storage module applying compressive force to a structure having the other power storage cells and the other heat transfer plates of the second power storage module, and wherein the first power storage module and the second power storage module are connected in series via a fuse, and wherein an endmost power storage cell of the first power storage module is connected to the fuse passing outside of an edge of the pushing plate of the first power storage module, and wherein an endmost power storage cell of the second power storage module is connected to the fuse passing outside of an edge of the pushing plate of the second power storage module.

11. The shovel according to claim 1, further comprising:
a connector box that is arranged on the side panel and has an opened portion, and
a connector that closes the opened portion.

12. The shovel according to claim 11, further comprising:
an opening that is arranged on the side panel; and
a relay circuit accommodated in the housing, the connector and the first power storage module being connected via the relay circuit,
wherein the connector box is provided on an outer surface of the side panel and closes the opening.

13. The shovel according to claim 1,
wherein the power storage device further comprises a second power storage module which is fixed inside the housing apart from the side panels, and includes a second plurality of power storage cells, a second plurality of heat transfer plates and a second pair of pushing plates, the second plurality of power storage cells and the second plurality of heat transfer plates of the second power storage module being arranged in a line, the second pair of pushing plates of the second power storage module applying compressive force to a structure having the second plurality of power storage cells and the second heat transfer plates of the second power storage module, the second heat transfer plates of the second power storage module being thermally coupled to the bottom panel and the upper panel on second lower end surfaces and second upper end surfaces of the second heat transfer plates of the second power storage module, respectively, and wherein the first power storage module and the second power storage module are arranged side by side inside the housing so that a direction in which the plurality of power storage cells and the plurality of heat transfer plates of the first power storage module are arranged in parallel to a direction in which the second plurality of power storage cells and the second plurality of heat transfer plates of the second power storage module are arranged, and wherein the power storage device further comprises a fuse which is inside the housing, the first power storage module and the second power storage module being connected via the fuse.

14. The shovel according to claim 13, wherein the first power storage module includes a first relay plate fixed to an outer surface of one of the pushing plates of the first power storage module via a first insulator and connected to a terminal of one of the power storage cells of the first power storage module, the second power storage module includes a second relay plate fixed to an outer surface of one of the second pair of pushing plates of the second power storage module via a second insulator and connected to a terminal of the power storage cells of the second power storage module, and the fuse is connected across the first relay plate of the first power storage module and the second relay plate of the second power storage module.

\* \* \* \* \*